United States Patent
Ji et al.

(10) Patent No.: US 10,652,175 B2
(45) Date of Patent: May 12, 2020

(54) MESSAGE SENDING METHOD AND APPARATUS, COMPUTER TERMINAL, AND STORAGE MEDIUM

(71) Applicant: TENCENT TECHNOLOGY (SHENZHEN) COMPANY LIMITED, Shenzhen (CN)

(72) Inventors: Kankan Ji, Shenzhen (CN); Chuanchuan Yang, Shenzhen (CN); Yankai Peng, Shenzhen (CN); Xiaolong Zhang, Shenzhen (CN); Wen Zhao, Shenzhen (CN); Chen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 15/973,293

(22) Filed: May 7, 2018

(65) Prior Publication Data

US 2018/0255007 A1 Sep. 6, 2018

Related U.S. Application Data

(63) Continuation of application No. PCT/CN2017/071754, filed on Jan. 19, 2017.

(30) Foreign Application Priority Data

Jan. 21, 2016 (CN) .......................... 2016 1 0042177

(51) Int. Cl.
*G06F 15/16* (2006.01)
*H04L 12/58* (2006.01)
(Continued)

(52) U.S. Cl.
CPC ............ *H04L 51/04* (2013.01); *G06F 3/0488* (2013.01); *G06F 3/04883* (2013.01);
(Continued)

(58) Field of Classification Search
CPC ....... H04L 51/04; H04L 51/063; H04L 51/32; H04L 51/12; H04L 12/1813;
(Continued)

(56) References Cited

U.S. PATENT DOCUMENTS 10,050,925 B1 * 8/2018 Showalter ................ H04L 51/28
2008/0307040 A1 * 12/2008 So ........................... G06Q 10/10
709/203
(Continued)

FOREIGN PATENT DOCUMENTS

CN 103269303 A 8/2013
CN 103269305 A 8/2013
(Continued)

OTHER PUBLICATIONS

TalkBass.com, blog on SWR sm-400 bass head, published online in 2014. 13 pages (Year: 2014).*
(Continued)

*Primary Examiner* — Richard G Keehn
(74) *Attorney, Agent, or Firm* — Anova Law Group, PLLC

(57) ABSTRACT

A message sending method includes: displaying chat messages on a chat interface, which is one of a group chat interface and a single chat interface; when detecting a reply operation performed by a user on a first chat message in the chat messages, obtaining content of the first chat message and content of a reply message corresponding to the reply operation; combining the content of the first chat message and the content of the reply message into a second chat message; when the first chat message is on the group chat
(Continued)

interface, sending the second chat message to a client corresponding to each chat account that participates in a group chat; and when the first chat message is on the single chat interface, sending the second chat message to a client corresponding to a chat account that posted the first chat message.

20 Claims, 16 Drawing Sheets

(51) Int. Cl.
  *H04L 12/18* (2006.01)
  *G06F 3/0488* (2013.01)
  *H04M 1/725* (2006.01)
  *G06F 3/0482* (2013.01)

(52) U.S. Cl.
  CPC ........ *H04L 12/1813* (2013.01); *H04L 51/063* (2013.01); *H04L 51/12* (2013.01); *H04L 51/32* (2013.01); *H04M 1/72547* (2013.01); *G06F 3/0482* (2013.01); *H04L 12/1822* (2013.01); *H04M 2250/22* (2013.01)

(58) Field of Classification Search
  CPC ............... H04L 12/1822; G06F 3/0482; G06F 3/04883; G06F 3/04888; H04M 2250/22; H04M 1/72547
  See application file for complete search history.

(56) References Cited

U.S. PATENT DOCUMENTS

| | | | |
|---|---|---|---|
| 2009/0193430 A1 | 7/2009 | Chao | |
| 2014/0298210 A1* | 10/2014 | Park | G06F 3/0486 715/758 |
| 2015/0334142 A1* | 11/2015 | Gottlieb | H04N 7/15 715/753 |
| 2016/0277335 A1* | 9/2016 | Cheung | H04L 51/12 |
| 2016/0343087 A1* | 11/2016 | Dange | G06F 16/35 |

FOREIGN PATENT DOCUMENTS

| | | |
|---|---|---|
| CN | 103269310 A | 8/2013 |
| CN | 103747138 A | 4/2014 |
| CN | 104052655 A | 9/2014 |
| CN | 105530174 A | 4/2016 |
| CN | 105553834 A | 5/2016 |

OTHER PUBLICATIONS

The State Intellectual Property Office of the People's Republic of China (SIPO) Office Action 1 for 201610042177.7 dated Apr. 23, 2019 10 Pages (including translation).
The World Intellectual Property Organization (WIPO) International Search Report for PCT/CN2017/071754 dated Mar. 1, 2017 5 Pages (including translation).

* cited by examiner

MESSAGE SENDING METHOD AND APPARATUS, COMPUTER TERMINAL, AND STORAGE MEDIUM

RELATED APPLICATIONS

This application is a continuation application of PCT Patent Application No. PCT/CN2017/071754, filed on Jan. 19, 2017, which claims priority to Chinese Patent Application No. 2016100421777, entitled "MESSAGE SENDING METHOD AND APPARATUS, COMPUTER TERMINAL, AND STORAGE MEDIUM" filed on Jan. 21, 2016, content of all of which is incorporated by reference in its entirety.

FIELD OF THE TECHNOLOGY

Embodiments of the present invention relate to the field of instant messaging and, specifically, to a message sending method and apparatus, a computer terminal, and a storage medium.

BACKGROUND OF THE DISCLOSURE

"Information overload" has become the first factor affecting the life-and-death of the social network. Nowadays, when information is extraordinarily abundant, a user gradually does not care about waste of information, but care about time and energy cost (quoted from *Overload Crisis: First Element Affecting Life and Death of a Social Network*, written by Xu Zhibin in 2014). In social interaction within a network group, on one hand, a user needs the group to be active to generate an exchange value; on the other hand, the user needs to extract content that the user follows with interest. A "completely inactive group" or an "over-active group" will finally cause the user to leave the group. The user cannot quickly locate dialog information that needs the user to process, from "overloaded information", increasing cost of the user for reading the information.

The disclosed methods and systems are directed to solve one or more problems set forth above and other problems.

SUMMARY

Embodiments of the present invention provide a message sending method and apparatus, a computer terminal, and a storage medium, to at least resolve the technical problem of high cost for obtaining information in a related technology.

According to one aspect of the embodiments of the present invention, a message sending method is provided. The message sending method includes: displaying chat messages on a chat interface, wherein the chat interface is one of a group chat interface and a single chat interface, the group chat interface being a chat interface that at least three chat accounts participate, and the single chat interface being a chat interface that two chat accounts participate; when detecting a reply operation performed by a user on a first chat message in the chat messages, obtaining content of the first chat message and content of a reply message corresponding to the reply operation; combining the content of the first chat message and the content of the reply message into a second chat message; when the first chat message is on the group chat interface, sending the second chat message to a client corresponding to each chat account that participates in a group chat; and when the first chat message is on the single chat interface, sending the second chat message to a client corresponding to a chat account that posted the first chat message.

According to another aspect of the embodiments of the present invention, a message sending system is further provided. The message sending system includes a memory storing instructions; and a processor coupled to the memory. When executing the instructions, the processor is configured for: displaying chat messages on a chat interface, wherein the chat interface is one of a group chat interface and a single chat interface, the group chat interface being a chat interface that at least three chat accounts participate, and the single chat interface being a chat interface that two chat accounts participate; when detecting a reply operation performed by a user on a first chat message in the chat messages, obtaining content of the first chat message and content of a reply message corresponding to the reply operation; combining the content of the first chat message and the content of the reply message into a second chat message; when the first chat message is on the group chat interface, sending the second chat message to a client corresponding to each chat account that participates in a group chat; and when the first chat message is on the single chat interface, sending the second chat message to a client corresponding to a chat account that posted the first chat message.

According to another aspect of the embodiments of the present invention, a non-transitory computer-readable storage medium is further provided. The non-transitory computer-readable storage medium contains computer-executable instructions for, when executed by one or more processors, performing a message sending method. The message sending method includes: displaying chat messages on a chat interface, wherein the chat interface is one of a group chat interface and a single chat interface, the group chat interface being a chat interface that at least three chat accounts participate, and the single chat interface being a chat interface that two chat accounts participate; when detecting a reply operation performed by a user on a first chat message in the chat messages, obtaining content of the first chat message and content of a reply message corresponding to the reply operation; combining the content of the first chat message and the content of the reply message into a second chat message; when the first chat message is on the group chat interface, sending the second chat message to a client corresponding to each chat account that participates in a group chat; and when the first chat message is on the single chat interface, sending the second chat message to a client corresponding to a chat account that posted the first chat message.

In the embodiments of the present invention, the chat message is displayed on the chat interface, where the chat message is a message from the message group; when the reply operation performed by the user on the first chat message in the chat message is detected, the content of the first chat message and the content of the reply message corresponding to the reply operation are obtained; the content of the first chat message and the content of the reply message are combined into the second chat message; and the second chat message is sent, thereby achieving the technical effect of reducing cost of obtaining messages, and resolving the technical problem of the high cost of obtaining messages.

BRIEF DESCRIPTION OF THE DRAWINGS

The accompanying drawings described herein are used to provide further understanding about the present disclosure, and form a portion of this application, but do not constitute any inappropriate limitation on the present disclosure. In the accompanying drawings.

DETAILED DESCRIPTION

Figure 1:
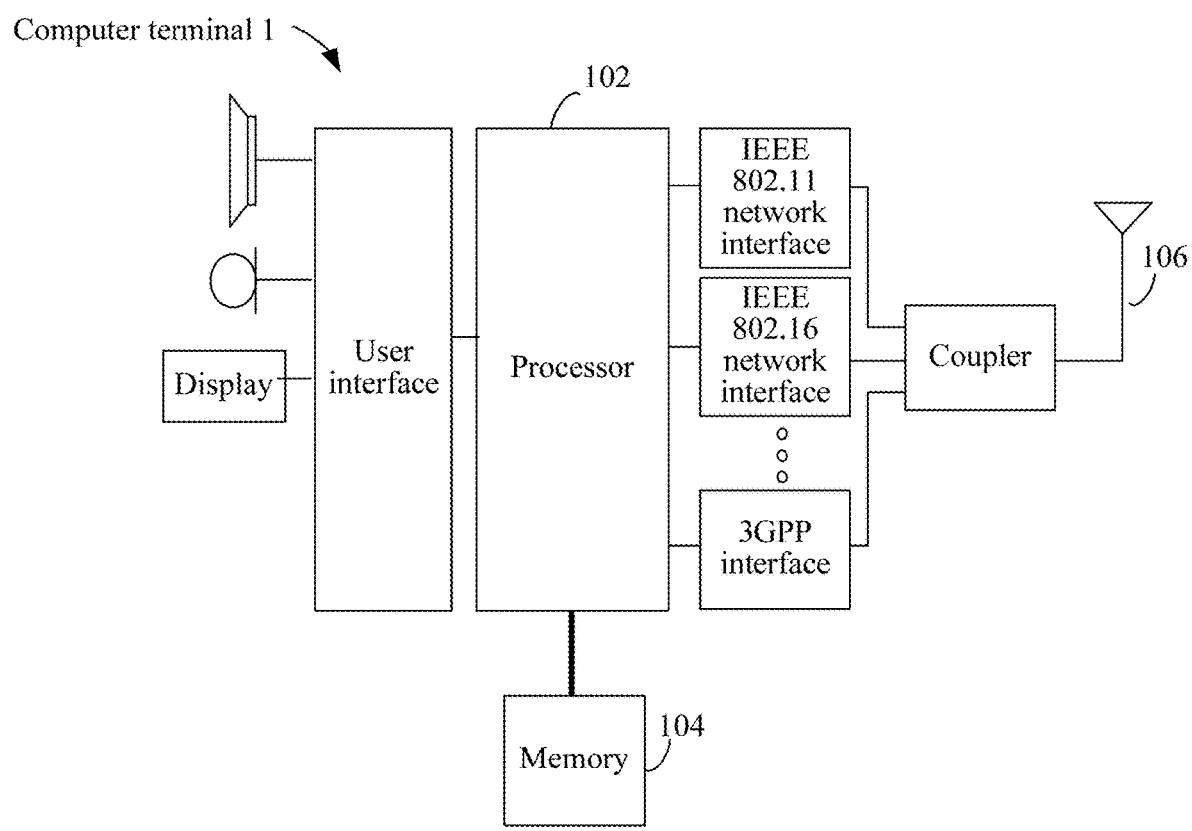
FIG. 1 illustrates a structural block diagram of hardware of a computer terminal of a message sending method according to an embodiment of the present invention.

The followings describe the technical solutions in the embodiments of the present invention with reference to the accompanying drawings in the embodiments of the present invention. Apparently, the described embodiments are some embodiments of the present invention rather than all embodiments. Other embodiments derived by a person of ordinary skill in the art based on the disclosed embodiments of the present invention without creative efforts shall fall within the protection scope of the present disclosure.

It should be noted that, the terms such as "first" and "second" in the specification and claims of the present disclosure and the accompanying drawings are used to distinguish similar objects, but are not necessarily used to describe a specific sequence or a precedence level. It should be understood that, data used in this way may be interchanged in a proper circumstance, so that the embodiments of the present invention described herein can be implemented in a sequence different from those shown in the drawings or described herein. In addition, terms "include" and "have" and any variation thereof are intended to be nonexclusive. For example, a process, method, system, product, or device including a series of steps or units are not limited to those listed steps or units, but may include another step or unit that is not listed or is inherent for the process, method, product or device.

According to an embodiment of the present invention, an embodiment of a message sending method is provided. It should be noted that, the steps shown in the flowchart of the accompanying drawing may be performed, for example, in a computer system with computer executable instructions. In addition, although a logical sequence is shown in the flowchart, in some cases, the shown or described steps may be performed in a sequence different from the sequence herein.

The disclosed message sending method may be executed in a mobile terminal, a computer terminal, or a similar operation apparatus. Using the computer terminal as an example, FIG. 1 is a hardware structural block diagram of a computer terminal for a message sending method according to an embodiment of the present invention.

As shown in FIG. 1, a computer terminal 1 may comprise one or more (only one is shown in the figure) processors 102 (the processor 102 may comprise but is not limited to a processing device, such as a microprocessor or MCU, or a programmable logical device or FPGA), a memory 104 used for storing data, and a transmission module 106 used for communication functions. A person of ordinary skill in the art may understand that, the structure shown in FIG. 1 is only exemplary, and does not constitute a limitation on the structure of the foregoing electronic apparatus. For example, the computer terminal 1 may further comprise more or fewer components than those shown in FIG. 1, or have a configuration different from that shown in FIG. 1.

The memory 104 may be configured to store software programs and modules of application software, such as program instructions/modules corresponding to the message sending method in the embodiments of the present invention. The processor 102 executes the software programs and modules stored in the memory 104, so as to execute various function applications and data processing, that is, implement the foregoing message sending method. The memory 104 may comprise a high speed random access memory, and may further comprise a non-volatile memory, such as one or more magnetic storage apparatuses, flash memories, or other non-volatile solid-state memories. In some instances, the memory 104 may further comprise memories disposed remotely in relative to the processor 102, and these remote memories may be connected to a terminal 1 by using a network. An instance of the foregoing network includes but is not limited to the Internet, an enterprise intranet, a local area network, a mobile communications network, or a combination thereof.

The transmission module 106 is configured to receive or send data by using a network. A specific instance of the network may comprise a wireless network provided a communications provider of the computer terminal 1. In an instance, the transmission module 106 comprises a network interface controller (NIC), and the NIC may be connected to another network device or a router by using a base station, so as to communicate with the Internet. In an instance, the transmission module 106 may be a radio frequency (RF) module, and the RF module is configured to communicate with the Internet in a wireless manner.

Figure 2:
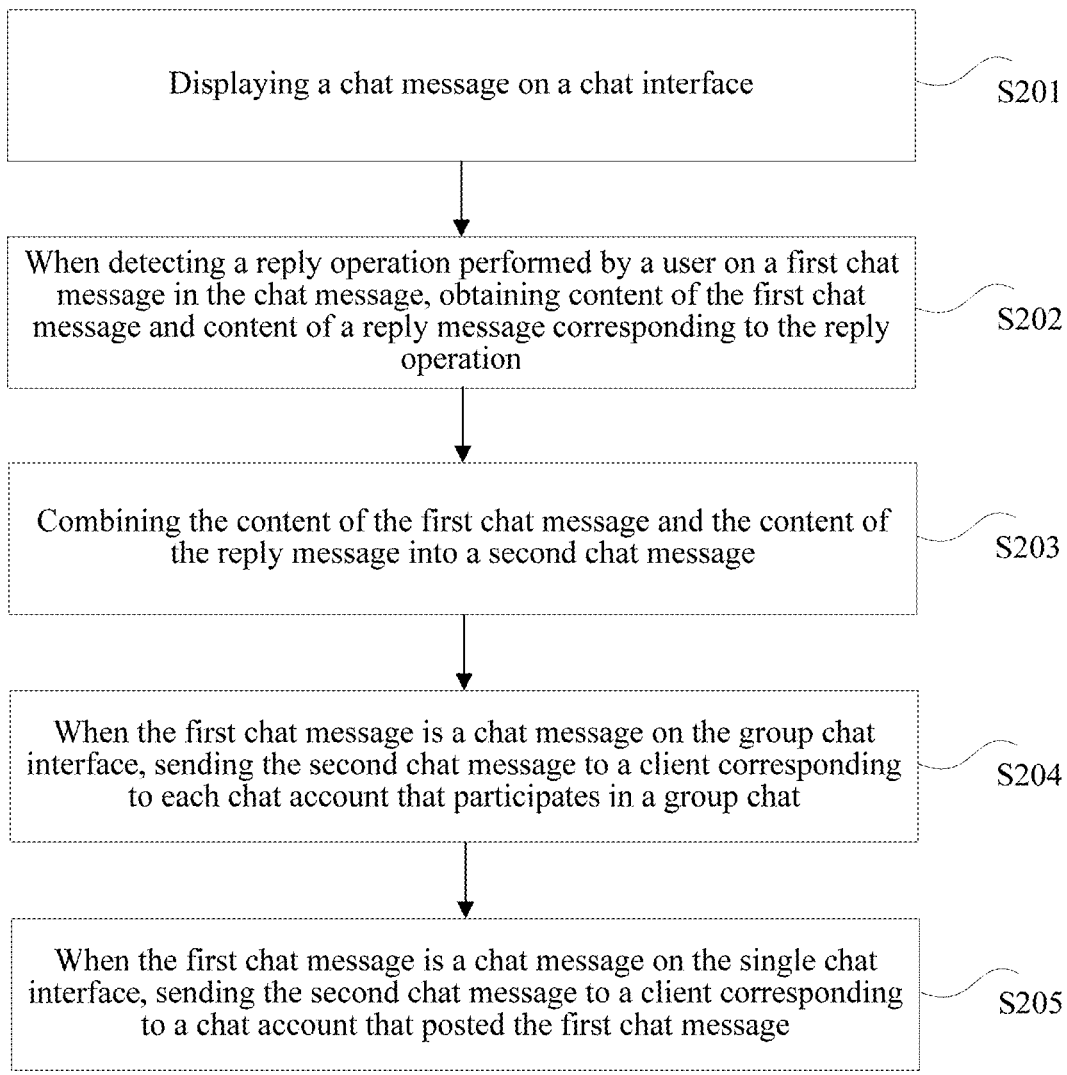
FIG. 2 illustrates a flowchart of a message sending method according to an embodiment of the present invention.

In the foregoing running environment, this application provides a message sending method shown in FIG. 2. The method may be applied to an intelligent terminal device, and executed by a processor in the intelligent terminal device. The intelligent terminal device may be a smartphone, a tablet computer, or the like (e.g., as shown in FIG. 1). At least one application program is installed in the intelligent terminal device, and the type of the application program is not limited in one embodiment. The application program may be a system-type application program, or may be a software-type application program.

FIG. 2 is a flowchart of a message sending method according to an embodiment of the present invention. As shown in FIG. 2, the message sending method includes the following.

Step S201: Displaying a chat message on a chat interface.

Specifically, the chat message is displayed on the chat interface, where the chat interface is a group user chat interface or a single chat interface. The group chat interface is a chat interface that at least three chat accounts participate (i.e., the user and two other chat accounts), and the single chat interface is a chat interface that two chat accounts participate (i.e., the user and another chat account). The displaying a chat message on a chat interface may be implemented by using an instant messaging application. The instant messaging application may be online chat or communication software, such as Tencent QQ, WeChat, and Yixin, by using an instant messaging technology. A user may send files in multiple forms such as text, emoticon, image, voice, and video between multiple clients by using the chat interface. When a file is sent for communication in a group, the communication on the chat interface of the instant messaging interface in this embodiment may be communication among multiple users in the group, and the chat message is displayed on the chat interface of the group chat.

The chat interface in this embodiment may be a chat interface of an instant messaging application on multiple types of terminals such as a computer, an intelligent mobile terminal, and a tablet computer. Multiple chat messages are displayed on the chat interface, and the multiple chat messages may be multiple chat messages from different accounts. For example, on a chat interface of a QQ friend group, multiple chat messages from different accounts may be displayed.

Step S202: When detecting a reply operation performed by a user on a first chat message in the chat message, obtaining content of the first chat message and content of a reply message corresponding to the reply operation.

Specifically, when the reply operation performed by the user on the first chat message in the chat messages is detected, the content of the first chat message and the content of the reply message corresponding to the reply operation are obtained. The first chat message is a target message that is selected from multiple chat messages for reply. The user may reply to the first chat message that is sent by the user itself, or may reply to the first chat message that is sent by another user.

Optionally, a first client is a software client, and is configured to display the chat message on the chat interface. The reply operation on the first chat message comprises that the first client determines the first chat message from multiple chat messages, and the user locates the first chat message and then clicks a screen location corresponding to the first chat message. The first client receives a first touch control signal that is generated by the clicking on the screen location corresponding to the first chat message by the user. After the first client receives the first touch control signal that is generated by the clicking on the screen location corresponding to the first chat message by the user, a message operation bar pops up in the first client. The message operation bar may display multiple manners of operations on the first chat message, for example, to display a "reply" operation, where the "reply" operation is an operation used for replying to the first chat message. The chat interface pops up by means of the "reply" operation, where "reply+reply message" is displayed on the chat interface. The user directly enters the content of the reply message in the chat interface, and then replies to the first chat message. Optionally, the reply operation on the first chat message includes that, after the first client receives the first touch control signal generated at the screen location corresponding to the first chat message, the chat interface directly pops up in the first client, and then the first client replies to the first chat message, thereby obtaining the content of the first chat message and the content of the reply message corresponding to the reply operation.

In one embodiment, when the reply operation performed by the user on the first chat message in the chat message is detected, the content of the first chat message and the content of the reply message corresponding to the reply operation are obtained. The first client determines the first chat message in the multiple chat messages. This may increase the speed of replying to the target message, thereby promptly notifying the first account that sends the first chat message that a message is replied to, locating a target reading message, and increasing efficiency of message exchange of the instant messaging application.

Step S203: Combining the content of the first chat message and the content of the reply message into a second chat message.

Specifically, after the first client receives the first touch control signal for the first chat message, the user enters the reply message. The reply message is a message that is from a second account and that is for replying to the first chat message, that is, the reply message is a message used by the first client, which is logged on by using the second account, to reply to the first chat message. The reply message may be a text message, may be an emoticon message, or the like. After receiving the reply message corresponding to the first touch control signal, the first client combines the content of the first chat message and the content of the reply message into the second chat message.

Step S204: When the first chat message is a chat message on the group chat interface, send the second chat message to a client corresponding to each chat account that participates in a group chat.

In the solution provided in step S204 of this application, after the content of the first chat message and the content of the reply message are combined into the second chat message, when the first chat message is a chat message in the group chat interface, the second chat message is sent to the individual client corresponding to each chat account that participates in the group chat. Optionally, the second chat message is sent to a client corresponding to the first chat message, wherein the client is logged on by using an account, the user corresponding to the account enters the first chat message into the client, and the client sends the first chat message. After the content of the first chat message and the content of the reply message are combined into the second chat message, the second chat message is sent to another client corresponding to another chat message different from the first chat message in the chat message, that is, each client corresponding to the chat message in the chat interface may receive the second chat message. Optionally, even if not sending the chat message, a client corresponding to another account in the message group may receive the second chat message, thereby implementing chat message sharing, and improving user experience.

The group may comprise multiple chat accounts. When the first chat message is a chat message in the group chat interface, the second chat message is sent to the client corresponding to each chat account that participates in the group chat. The client corresponding to each chat account that participates in the group chat is a client corresponding to each account in the group, that is, a client corresponding to a chat account of the first chat message that is replied to may receive the second chat message, and the client corresponding to another account that is in the group and that may participate in chat may also receive the second chat message. Each chat account that participates in the group chat comprises a chat account that is in the group and that actually participates in chat previously, and also comprises a chat account that is in the group and that did not participate in chat previously. Therefore, for the client corresponding to each chat account, no matter whether the client has previously participated in chat in the group, as long as the client has a chat account in the group, the client corresponding to that account may receive the second chat message, so that the second chat message is visible to all friends/users corresponding to all accounts in the message group, facilitating reading by the user and interaction by means of messages between the user and the group, and improving the user experience.

Figure 3:
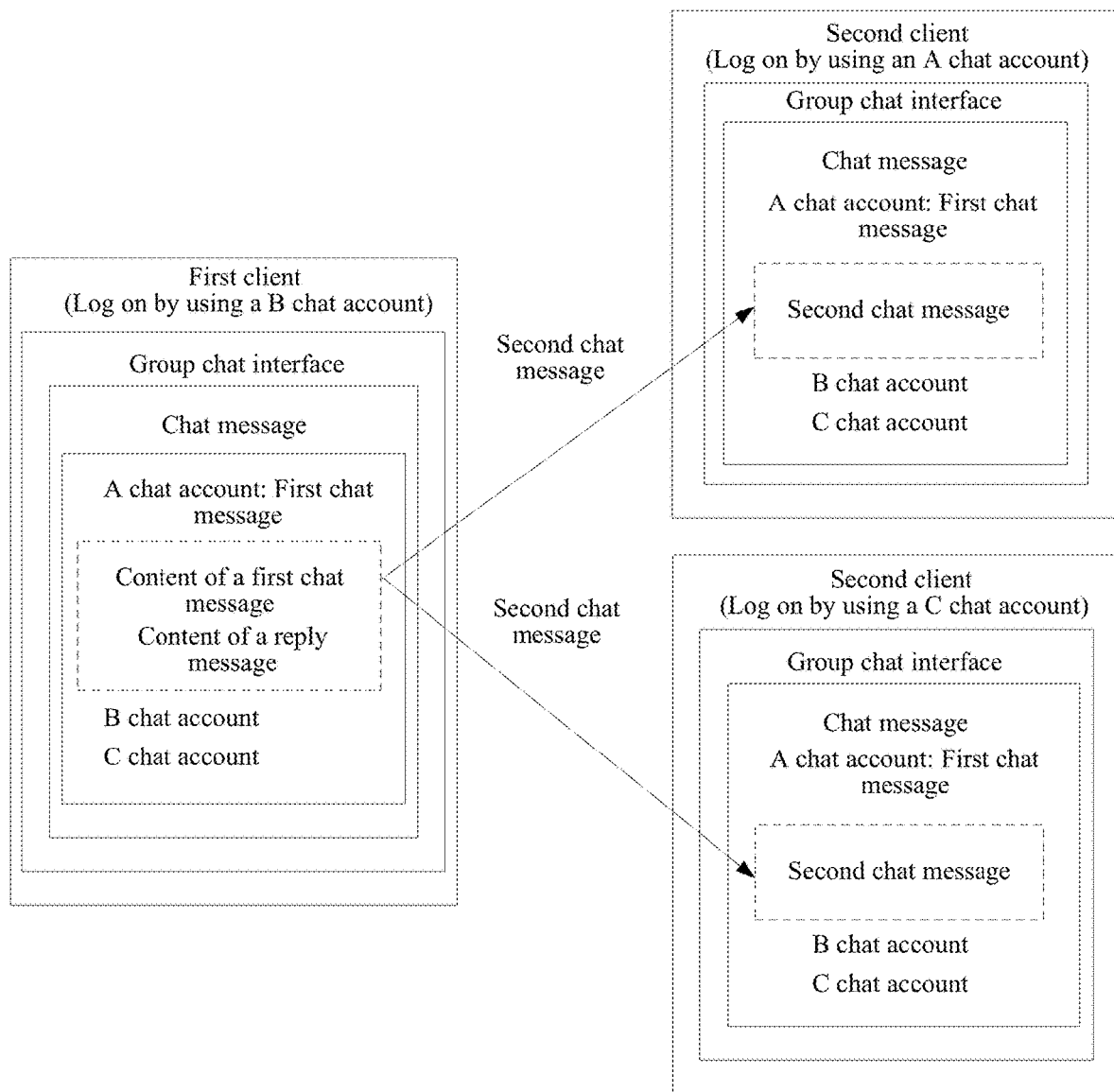
FIG. 3 illustrates a schematic diagram of message exchange between a first client and a second client according to an embodiment of the present invention.

FIG. 3 is a schematic diagram of message exchange between a first client and a second client according to an embodiment of the present invention. As shown in FIG. 3, a chat account in a group comprises an A chat account, a B chat account, and a C chat account. The first client is logged on by using the B chat account, and displays a first chat message. A chat account of the first chat message is the A chat account. The second client is a software client, and is any client except the first client in clients corresponding to chat accounts that participates in a group chat. The second client is separately logged on by using the A chat account and the C chat account, displays the first chat message. The first client replies to the first chat message that has been sent by another user. Optionally, a user corresponding to the B chat account performs a reply operation on the first chat message of the A chat account by using the first client, and enters a reply message. The first client combines content of the first chat message and content of the reply message into a second chat message, and sends the second chat message to a second client logged on by using the A chat account and the C chat account. The second chat message is also displayed in the first client.

Optionally, after entering the reply message for the first chat message by using the first client, the user clicks the "Send" button in the first client. After receiving a trigger signal of the "Send" button, the first client sends the second chat message to the second client. The second client is logged on by using the first account. For example, the first account may be the A chat account or the B chat account. The second client is logged on by using the A chat account, and another second client is logged on by using the B chat account. When the first client sends the reply message to the second client, the second client may display the first chat message and the reply message, that is, the second client displays the second chat message.

Optionally, the message group of the second client can be configure such that the second chat message is displayed only in a client corresponding to a specified account, and is not displayed in a client corresponding to another account other than the specified account. That is, the second chat message is visible to a specified friend in the message group, and a friend corresponding to another account cannot see the second chat message, thereby ensuring user freedom in the group chat.

Preferably, for convenience of timely viewing by the user, when the second chat message is sent to the second client, a prompt message is displayed in the second client, to prompt the first account of the second client that the previously-sent first chat message has a reply message.

Step S205: When the first chat message is a chat message on the single chat interface, sending the second chat message to a client corresponding to the chat account that posts the first chat message.

Specifically, after the content of the first chat message and the content of the reply message is combined into the second chat message, when the first chat message is a chat message in the single chat interface, the second chat message is sent to the client corresponding to the chat account that posts the first chat message, that is, the second chat message is only sent to the client corresponding to the first chat message. That is, the client is logged on by using a chat account, a user corresponding to the chat account enters the first chat message into the client, and the client sends the first chat message.

Figure 4:
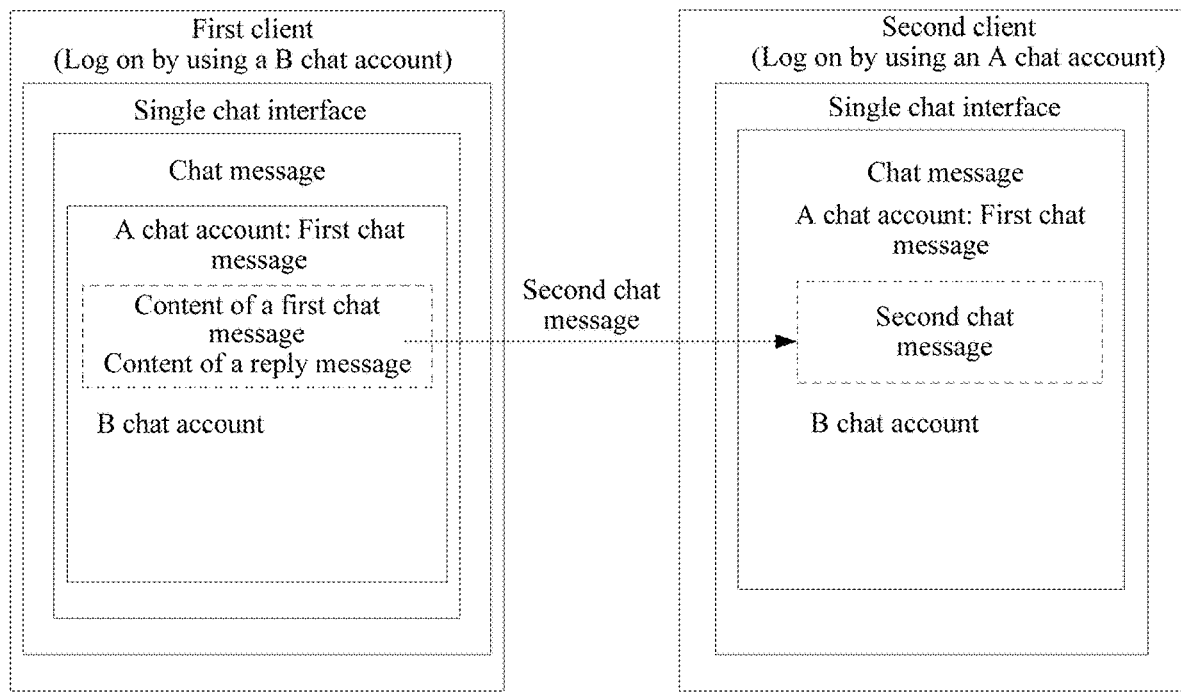
FIG. 4 illustrates another schematic diagram of message exchange between a first client and a second client according to an embodiment of the present invention.

FIG. 4 is another schematic diagram of message exchange between a first client and a second client according to an embodiment of the present invention. As shown in FIG. 4, the single chat comprises the A chat account and the B chat account. The first client is logged on by using the B chat account, and displays the first chat message. The chat account of the first chat message is the A chat account. The second client is a software client, is logged on by using the A chat account, and displays the first chat message. The user corresponding to the B chat account performs the reply operation on the first chat message, and enters the reply message. The first client combines the content of the first chat message and the content of the reply message into the second chat message, and sends the second chat message to the second client. The second chat message is also displayed in the first client.

Thus, according to the disclosed embodiments, the first touch control signal for the first chat message may be received in multiple manners, and the second chat message may be sent in multiple manners to the client corresponding to each chat account that participates in the group chat or the client corresponding to the chat account of the first chat message. Other sending manners may also be used to increase message sending accuracy and efficiency of reading by the user.

According to the Steps S201-S205 described above, the chat message is displayed on the chat interface; when the reply operation performed by the user on the first chat message in the chat message is detected, the content of the first chat message and the content of the reply message corresponding to the reply operation are obtained; the content of the first chat message and the content of the reply message is combined into the second chat message; and the second chat message is sent, thereby resolving the problem of high cost of message obtaining, increasing efficiency of useful information obtaining by the user, reducing cost of the reading by the user, and achieving the objective of quick locating and displaying chat message.

Figure 5:
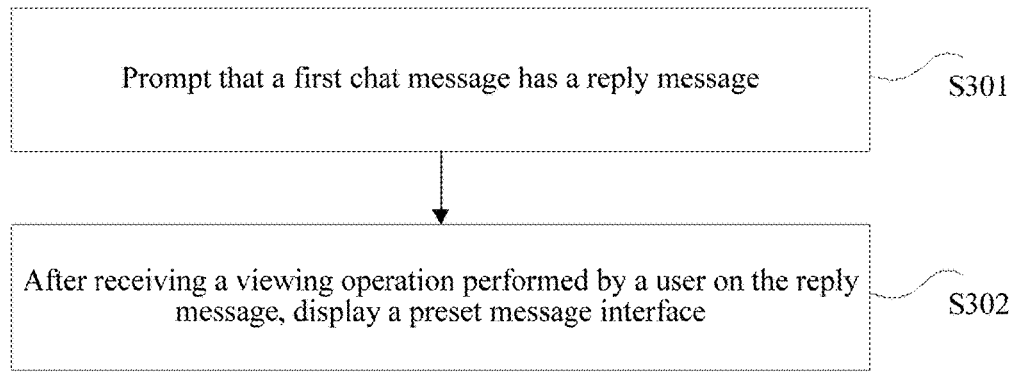
FIG. 5 illustrates a flowchart of a message sending method according to an embodiment of the present invention.

Optionally, in Step S204, after the second chat message is sent to the client corresponding to each chat account that participates in the group chat or the second chat message is sent to the client corresponding to the chat account that releases the first chat message, the message sending method in this embodiment may further comprise: prompting, in the message group, that the first chat message has a reply message; and after receiving a viewing operation performed by the user on the reply message, displaying a preset message interface, wherein the preset message interface is an interface used for displaying the second chat message. FIG. 5 is a flowchart of a message sending method according to an embodiment of the present invention.

As shown in FIG. 5, the message sending method includes the followings.

Step S301: Prompting that a first chat message has a reply message.

Specifically, after a client corresponding to the first chat message and a client corresponding to another chat message except the first chat message in a chat message, it is prompted in the message group that the first chat message has the reply message. The prompting in the message group that the first chat message has the reply message may be implemented by sending message prompt information to a second client. Optionally, the message prompt information is the prompt information when the second client receives a first reply message. For example, the message prompt information may be a special prompt form, such as ringing, vibration, or light flickering, and may implement prompting by using text in a message list of an instant messaging application, for example, "I am replied", or implement prompting in multiple prompt forms, such as displaying in a small red circle in a group chat column of a message list of an instant messaging application, to prompt a user that there is a new message that replies to the first chat message. Optionally, in the message prompt form, such as ringing, vibration, light flickering, or text, the user may be prompted that there is the new message that replies to the first chat message. A reply manner of the new message may be set according to the requirement of the user. For example, the message prompt manner is different from another new message prompt manner in group chat, so as to quickly alert the user that the reply message that the user follows with interest has been received, and enable the user to quickly locate a target reading message.

Step S302: After receiving a viewing operation performed by a user on the reply message, displaying a preset message interface.

Specifically, the preset message interface is an interface used for displaying a message from a second account, that is, a message interface of the current group chat. For example, after the user clicks the small red circle displayed in the group chat column of the message list of the instant messaging application in the second client, chat messages from different clients and a history chat message are displayed on a group chat message interface. The second chat message comprises content of the first chat message and content of a reply message from the second account for the first chat message. To save the preset message interface, only prompt identifier used for touch control may be displayed. For example, a trigger identifier of "I am replied" is displayed on one side of the group chat message interface, and the preset message interface is displayed after the user clicks the trigger identifier.

Optionally, the second client receives a second touch control signal on the preset message interface. The second touch control signal is a signal that displays a reply message. For example, the second touch control signal may include profile information of the second account and prompt information of "I am replied." After the second client receives the second touch control signal on the preset message interface, the second client displays a second chat message corresponding to the second touch control signal. The displaying, by the second client, a second chat message comprises displaying, on the preset message interface, multiple reply messages of the second account for the first account. The second client may further display all history chat messages sent by the first account during the group chat of the message group, for the user to view.

According to Steps S301-S302, it is prompted in the message group that the first chat message has the reply message, the preset message interface is displayed after the viewing operation performed by the user on the reply message is received, the second client obtains the message prompt information, the second client displays the preset message interface according to the message prompt information, the second client receives the second touch control signal on the preset message interface, and the second client displays the second chat message corresponding to the second touch control signal, thereby increasing message reading efficiency of the user, improving user experience, and reducing message reading cost.

Optionally, a message used by the first client to reply to the first chat message is the first reply message, and there are multiple first reply messages. The second client is logged on by using the first account, to display multiple first reply messages, and the multiple first reply messages may be displayed on a preset message interface in the order of reply time. Optionally, the reply time of the multiple first reply messages are displayed in on preset message interface, for the user to view. The target reply message is a message that replies to the first reply message again, that is, replies to the first reply message again after the second client receives the first reply message. A third touch control signal is a signal used by the second client to reply to the target reply message. Optionally, the user logs on to the second client that has the first account. After the user clicking the target reply message, the second client displays an operation bar used for replying to the target reply message. When the user clicks the operation bar that is of the second client and that is used for replying to the target reply message, the second client receives the third touch control signal, and obtains the second reply message corresponding to the third touch control signal. The second reply message may be a text message, may be an emoticon message, or the like. Finally, the second reply message is sent to the first client, and the second reply message is used as the first chat message of the first client. For example, after entering the second reply message into the second client, the user clicks the "Send" button, to send the second reply message to the first client, so that the first client obtains the second reply message, thereby reducing the message reading cost of the user, and enabling the user to quickly find useful information in multiple pieces of information.

Figure 6:
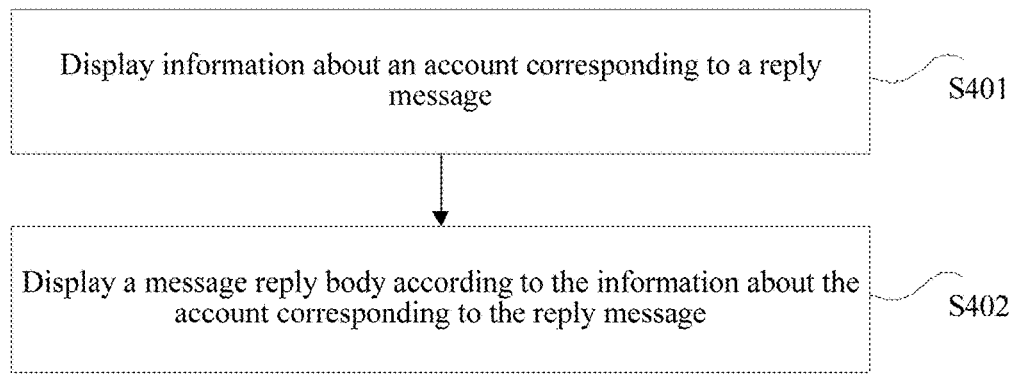
FIG. 6 illustrates a flowchart of a message sending method according to an embodiment of the present invention.

FIG. 6 illustrates a flowchart of another message sending method according to an embodiment of the present invention. As shown in FIG. 6, after it is prompted in a message group that a first chat message has a reply message, the message sending method further comprises the followings.

Step S401: Displaying information about an account corresponding to the reply message.

The information about the account corresponding to the reply message may be information about a second account of a first client. The second client displays the information about the second account. The information about the second account may be information such as a profile, a nickname, and an account level, or may be information such as reply information from the second account. To save space on the interface and for ease of reading by a user, only the information such as the profile, the nickname, and the account level of the second account is displayed.

Step S402: Displaying a message reply body according to the information about the account corresponding to the reply message.

The message reply body is displayed according to the information about the account corresponding to the reply message, where the message reply body comprises message data corresponding to the second chat message. Optionally, the second chat message comprises data of the first chat message and data of the reply message. The data of the first chat message may be content data of the first chat message, sending time data of the first chat message, and other data of the first chat message, for example, data such as ornament of a message frame of the instant messaging application QQ. The data of the reply message may be message content data of the reply message, sending time data of the reply message, and the like.

Optionally, the second client displays the first chat message corresponding to the data of the first chat message and the reply message corresponding to the data of the reply message according to the second touch control signal.

Optionally, the second client displays, according to the second touch control signal, content of the first chat message, the message posting time corresponding to the first chat message, content of the first reply message, and the message posting time corresponding to the first reply message.

Optionally, the second client further displays history chat messages of the second account according to the second touch control signal. History information of the second account is the history chat messages sent by the second account in a dialog of previous group chat.

In one embodiment, the information about the account corresponding to the reply message is displayed, the message reply body is displayed according to the information about the account corresponding to the reply message, and the second client displays the information about the second account, so that the second client may display the history chat messages and the second chat message of the second account according to the information about the second account, improving reading efficiency of the user, and reducing reading cost of the user.

Figure 7:
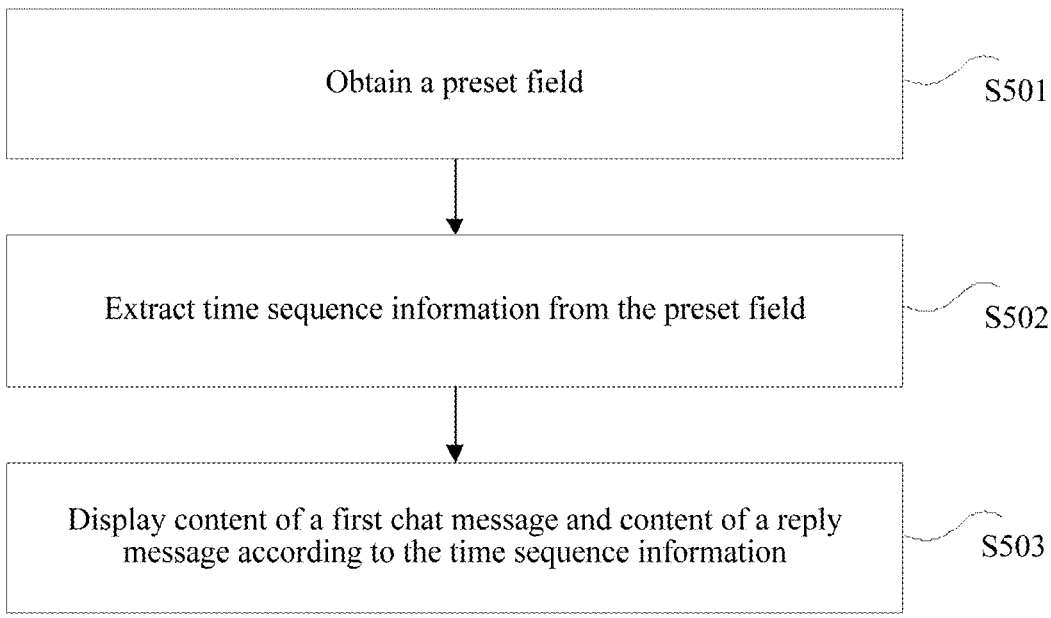
FIG. 7 illustrates a flowchart of a message sending method according to an embodiment of the present invention.

FIG. 7 illustrates a flowchart of another message sending method according to an embodiment of the present invention. As shown in FIG. 7, the message sending method further comprises the followings.

Step S501: Obtaining a preset field.

The preset field is used for recording content of a first chat message, content of a reply message, and time sequence information respectively corresponding to the content of the first chat message and the content of the reply message. The preset field is used for recording message content from a first account, message content from a second account, and time sequence information respectively corresponding to the message content from the first account and the message content from the second account. The preset field may include the message content of the first account arranged in a time sequence and the message content of the second account arranged in a time sequence.

Step S502: Extracting time sequence information from the preset field.

The extracting time sequence information from the preset field may include: extracting, from the preset field, time sequence information of messages being sent out, so as to arrange and display message content according to the time sequence information of messages being sent out.

Step S503: Displaying content of a first chat message and content of a reply message according to the time sequence information.

Displaying the message content from the first account and the message content from the second account according to the time sequence information may include: displaying the time and the content from the first account, and the time and content from the second account according to the time sequence information, arranging the message content from the first account and the second account in time order, and then displaying the message content on a preset message interface, which may be performed on the first client and the second client at the same time.

In one embodiment, the preset field is obtained, the time sequence information is extracted from the preset field, the content of the first chat message and the content of the reply message are displayed according to the time sequence information. That is, the message content from the first account and the message content from the second account are displayed according to the time sequence information, and messages are arranged in time sequence, so that the user conveniently read the messages, effectively reducing time cost of reading messages by the user.

Figure 8:
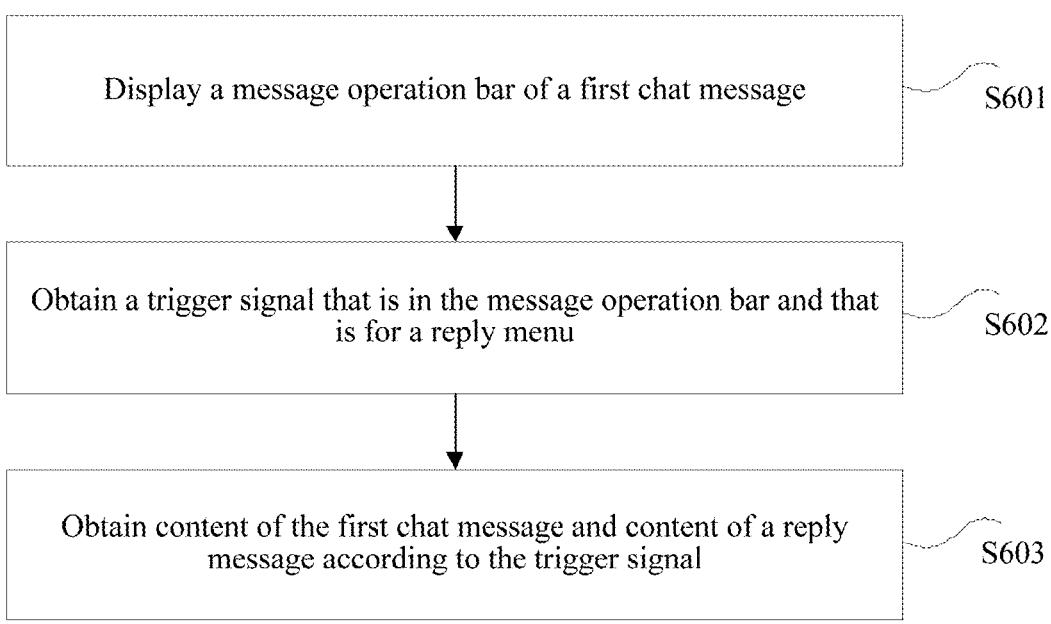
FIG. 8 illustrates a flowchart of a message sending method according to an embodiment of the present invention.

Optionally, a reply operation performed by a user on a first chat message in a chat message is detected. FIG. 8 is a flowchart of another message sending method according to an embodiment of the present invention. As shown in FIG. 8, the method includes the followings.

Step S601: Displaying a message operation bar of the first chat message.

When the reply operation performed by the user on the first chat message in the chat message is detected, the message operation bar of the first chat message is displayed, where the message operation bar is used for displaying a menu for performing an operation on the first chat message. That is, after a first client determines the first chat message in multiple messages, the message operation bar of the first chat message may be displayed on the first chat message. For example, the user clicks the first chat message to display an information operation bar on the first chat message. The information operation bar may comprise multiple menus for performing an operation on the first chat message, such as replying, copying, forwarding, and deleting, and the message operation bar may be specifically set according to the requirement of the user.

Step S602: Obtaining a trigger signal that is in the message operation bar and that is for the reply menu.

After the first client displays the message operation bar of the first chat message, the reply menu is selected from the message operation bar. The user may click the reply menu in the message operation bar, and the first client receives the trigger signal for the reply menu from the user.

Step S603: Obtaining content of the first chat message and content of a reply message according to the trigger signal.

After obtaining the trigger signal that is in the message operation bar and that is for the reply menu, the first client obtains the first chat message, and the user may enter the reply message of the first chat message on a chat interface that pops up in the first client, so that the first client obtains the content of the reply message.

In one embodiment, the message operation bar of the first chat message is displayed, the trigger signal that is in the message operation bar and that is for the reply menu is obtained, the content of the first chat message and the content of the reply message are obtained according to the trigger signal, the reply operation performed by the user on the first chat message in the chat message is performed, and the content of the first chat message and the content of the reply message corresponding to the reply operation are obtained, reducing message obtaining costs.

Optionally, the first client displays a message receiving interface. The message receiving interface is an interface used for displaying message content receiving. For example, below the message receiving interface, there is a chat interface used for entering a message, and multiple messages that are in group chat and that are from different clients may also be displayed on the message receiving interface. The first client receives the reply message on the message receiving interface. The reply message received by the first client on the message receiving interface may be a reply message that is entered by the user on the chat interface used for entering a message. The first client may also receive the reply message in another manner. For example, the user enters the reply message in a manner such as copying or pasting. The first reply message may be a text message, or may be a message in multiple forms such as a voice message. After the first client receives the first reply message on the message receiving interface, the first client displays the first chat message and the reply message for the first chat message. That is, the first client displays second chat message for the user to view, so that the user finds the first chat message without looking through history chat messages, saving time cost of reading messages by the user.

Figure 9:
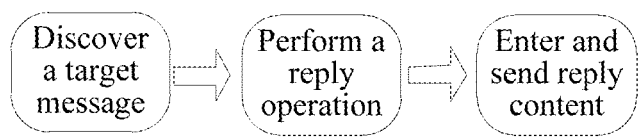
FIG. 9 illustrates a schematic flowchart of a message sending process according to an embodiment of the present invention.

FIG. 9 is a schematic flowchart of sending messages according to an embodiment of the present invention. As shown in FIG. 9, multiple chat messages are displayed on a chat interface, and a user discovers, from the multiple chat messages, a target message that needs to reply, that is, a first chat message, and performs a reply operation on the first chat message, for example, clicks a screen location corresponding to the first chat message, clicks "Reply" in an operation bar to reply to the first chat message, enters reply content on a preset interface, and sends the reply content. For example, when the reply operation performed by the user on the first chat message is detected, the chat interface pops up on the interface, and the user enters a reply message on the chat interface, obtains content of the first chat message and content of the reply message, combines contents of the two messages into one message, and sends the combined message as a second chat message to a message group.

Figure 10:
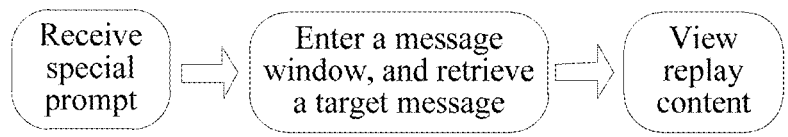
FIG. 10 illustrates a schematic flowchart of a message receiving process according to an embodiment of the present invention.

FIG. 10 is a schematic flowchart of receiving messages according to an embodiment of the present invention. As shown in FIG. 10, in a message group, if a sent message has a reply message, special prompt information can be received on a preset message interface. For example, in a message group that has a reply message, a small red circle is displayed, vibration is implemented, ringing is implemented, or the like, or any combination of the foregoing manners can be implemented, to prompt a user that the sent message has the reply message. The user clicks the message group, and another preset message interface, i.e., a message window, is displayed, for ease of reading and understanding by the user. The target message, i.e., the first chat message, is retrieved in the message window. In the message group that has multiple chat messages, the multiple chat messages are paged up to locate a page of the first chat message, and information such as a profile of a message replier may be displayed in the upper right corner of the interface, as a trigger identifier. After the user clicks the trigger identifier, a preset message interface of message prompt information is displayed, and all history chat messages sent by an account of the second chat message and an account of the first chat message can be viewed on this interface.

Figure 11:
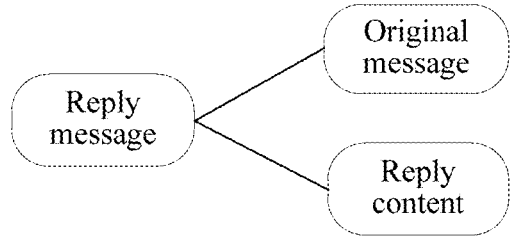
FIG. 11 illustrates a schematic diagram of a message body according to an embodiment of the present invention.

FIG. 11 is a schematic diagram of a message body according to an embodiment of the present invention. As shown in FIG. 11, the second chat message comprises a reply message, and the reply message further comprises an original message and reply content. The second chat message may further comprise a message box that is set by a user and that is of a session message in an instant messaging application. The message box may be theme-type ornament set by the user, and is used for decorating the session message in the instant messaging application, to make a session more pleasing to the eyes of the user. For example, a message box of the instant messaging application QQ may have multiple theme forms, such as a sea wave theme and a snowflake theme, and a reply message in the message box comprises an original message and reply content. The original message is a first chat message, and the reply content is message content that replies to the first chat message. For example, a sending time of the original message and a sending time of the reply message may be displayed in the message body, or a sending time of the original message and a sending time of the reply message may be displayed above the message body, so that the user can conveniently view the messages.

Figure 12:
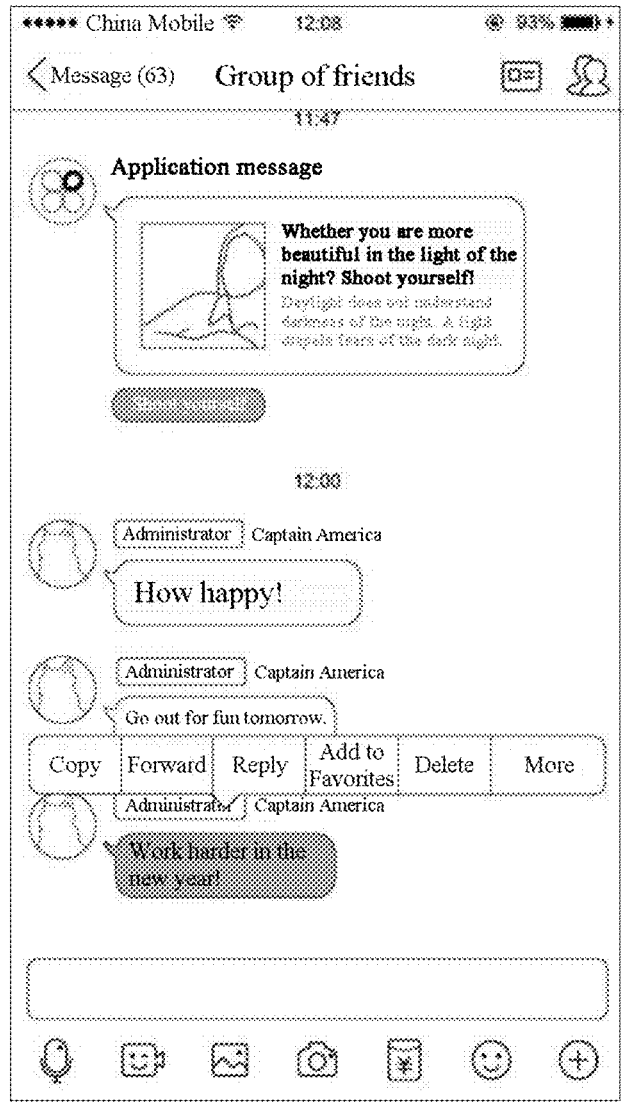
FIG. 12 illustrates a schematic screenshot diagram of receiving, on a first client, a first touch control signal for a target message according to an embodiment of the present invention.

FIG. 12 is a schematic screenshot diagram of receiving, on a first client, a first touch control signal for a first chat message (i.e., target message) according to an embodiment of the present invention. As shown in FIG. 12, the first client is logged on by using a second account. The message sending method is applied to a QQ message group. A name of the QQ message group is "Group of friends", and the first client displays application messages, there are multiple messages posted by a first account "Captain America", including "How happy!", "Go out for fun tomorrow", and "Work harder in the new year." "Go out for fun tomorrow" is determined as the first chat message, a user terminal may perform a touch operation on a terminal screen corresponding to the first chat message of "Go out for fun tomorrow", and the first client receives a first touch control signal by using the "Reply" menu. The first client displays a message operation bar of the first chat message. The message operation bar is used for displaying a menu for performing an operation on the first chat message. The menu in the message operation bar comprises menus of "Copy", "Forward", "Reply", "Add to Favorites", "Delete", and "More" for the first chat message. After the "Reply" menu is selected, the second account may reply to the first chat message of "Go out for fun tomorrow."

Figure 13:
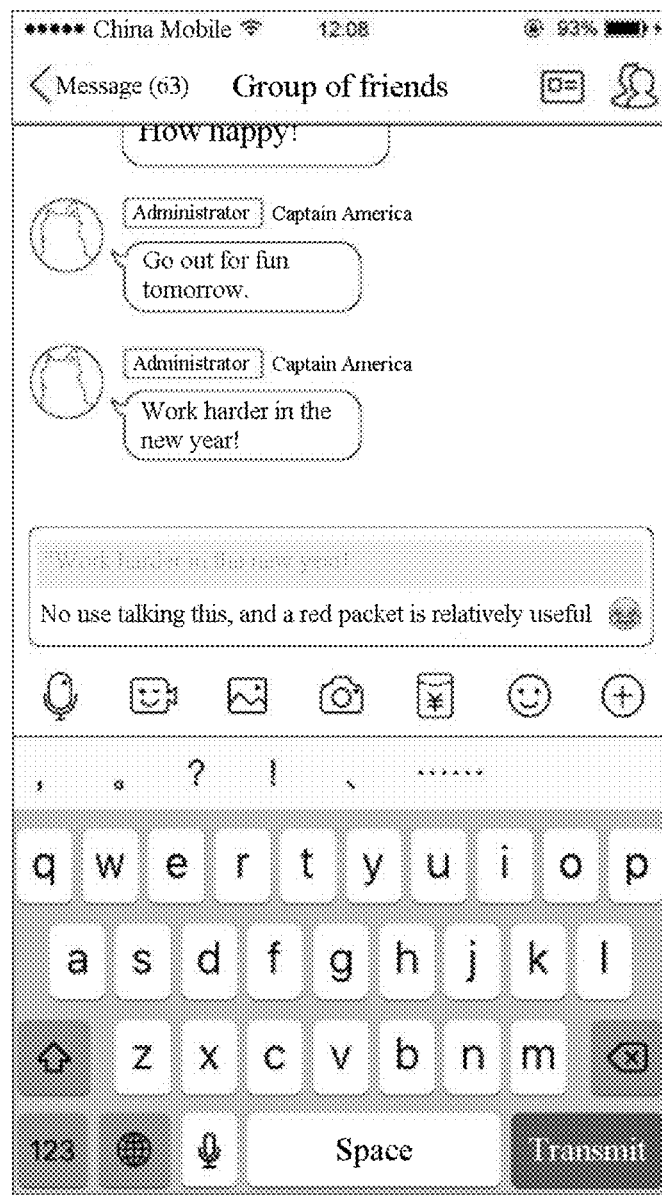
FIG. 13 illustrates a schematic screenshot diagram of obtaining, by a first client, a first reply message corresponding to a first touch control signal according to an embodiment of the present invention.

FIG. 13 is a schematic screenshot diagram of obtaining, by a first client, a first reply message corresponding to a first touch control signal according to an embodiment of the present invention. As shown in FIG. 13, the first client obtains the first reply message corresponding to the first touch control signal. The first client displays a message receiving interface. The message receiving interface is an interface used for displaying message content receiving, and may comprise a keyboard for manually entering a message and a message obtaining box. The first client receives the first reply message on the message receiving interface. For example, the first client uses the second account to reply "No use talking this, and a red packet is relatively useful/ emoticon."

Figure 14:
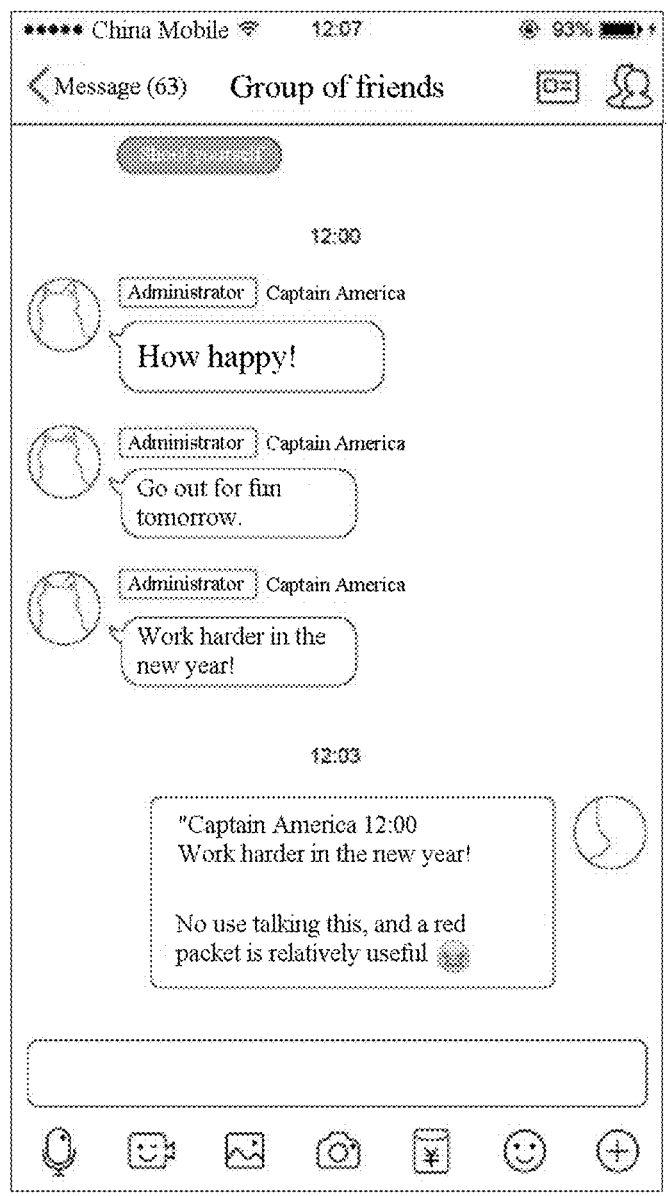
FIG. 14 illustrates a schematic screenshot diagram of obtaining, by a first client, a first reply message corresponding to a first touch control signal according to an embodiment of the present invention.

FIG. 14 is a schematic screenshot diagram of obtaining, by a first client, a first reply message corresponding to a first touch control signal according to an embodiment of the present invention. As shown in FIG. 14, after the first client obtains the first reply message corresponding to the first touch control signal, the first client displays the first chat message "Work harder in the new year" and the first reply message "No use talking this, and a red packet is relatively useful." The posting time of the first chat message "Work harder in the new year" and the posting time of the first reply message "No use talking this, and a red packet is relatively useful" are included.

Figure 15:
FIG. 15 illustrates a schematic screenshot diagram of obtaining, by a second client, message prompt information according to an embodiment of the present invention.

FIG. 15 is a schematic screenshot diagram of obtaining, by a second client, message prompt information according to an embodiment of the present invention. As shown in FIG. 15, the second client is logged on by using a first account. After the first client sends the first reply message to the second client, prompt information "[New reply] Iron man: No use talking this, and a red packet is . . . " is displayed in "Group of friends" of the second client, and a number of unread messages is displayed at the right end of the prompt information. The second client displays messages of multiple groups, for example, messages of "Group of high-level fans of the Xiuxian tribe", "Management detachment of the Xiuxian tribe", "Large group of group dynamics", "Group assistant", "Work team evaluation group of the Xiuxian tribe", and "New friends." Each group of the client may receive a prompt message for a reply message of the first account.

Figure 16:
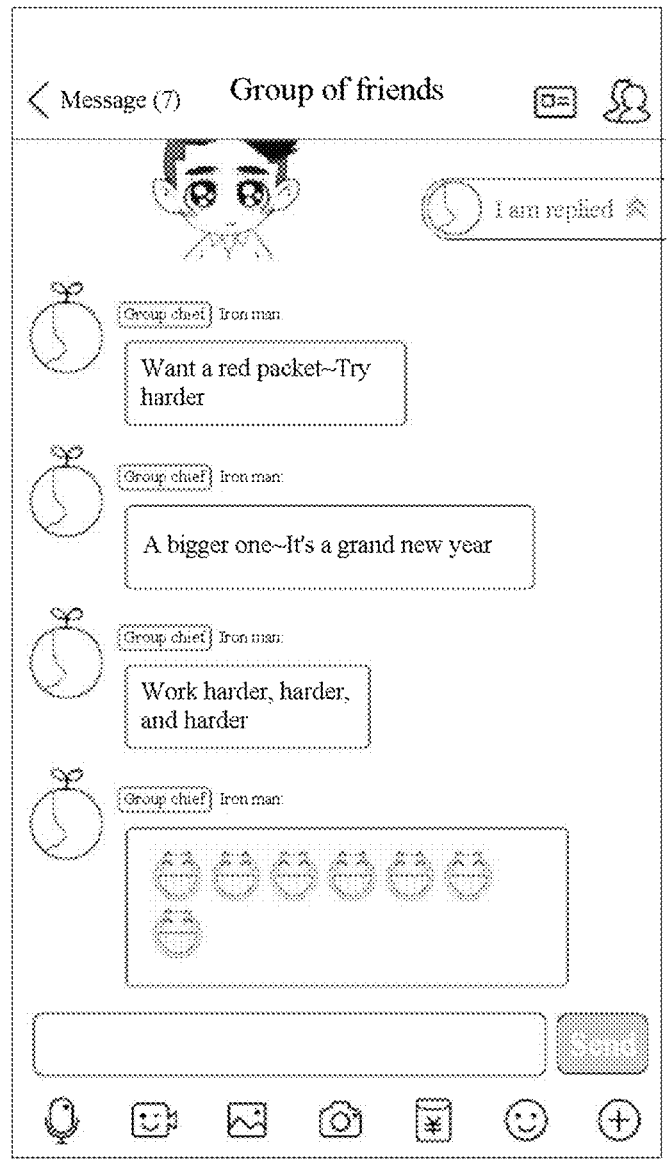
FIG. 16 illustrates a schematic screenshot diagram of displaying, by a second client, a preset message interface according to message prompt information according to an embodiment of the present invention.

FIG. 16 is a schematic screenshot diagram of displaying, by a second client, a preset message interface according to message prompt information according to an embodiment of the present invention. As shown in FIG. 16, the second client displays the preset message interface according to the message prompt information. The preset message interface is an interface used for displaying a message from a second account, that is, displaying information from "Iron man", including displaying a history chat message and a second chat message that are of "Iron man". The history chat message is a reply message before the second account, for example, a message such as "Want a red packet~Try harder", "A bigger one~It's a grand new year", or "Work harder, harder, and harder." The second chat message comprises data of a first chat message and data of a first reply message, that is, data corresponding to "I am replied" to the right of an image of "Iron man" included in the preset message interface. The second client receives a second touch control signal on the preset message interface. The second touch control signal is a signal for displaying the first reply message, that is, a touch control signal generated on a screen when a user terminal clicks an extension icon of "I am replied" to the right of the image of "Iron man". The preset message interface receives the second touch control signal.

Figure 17:
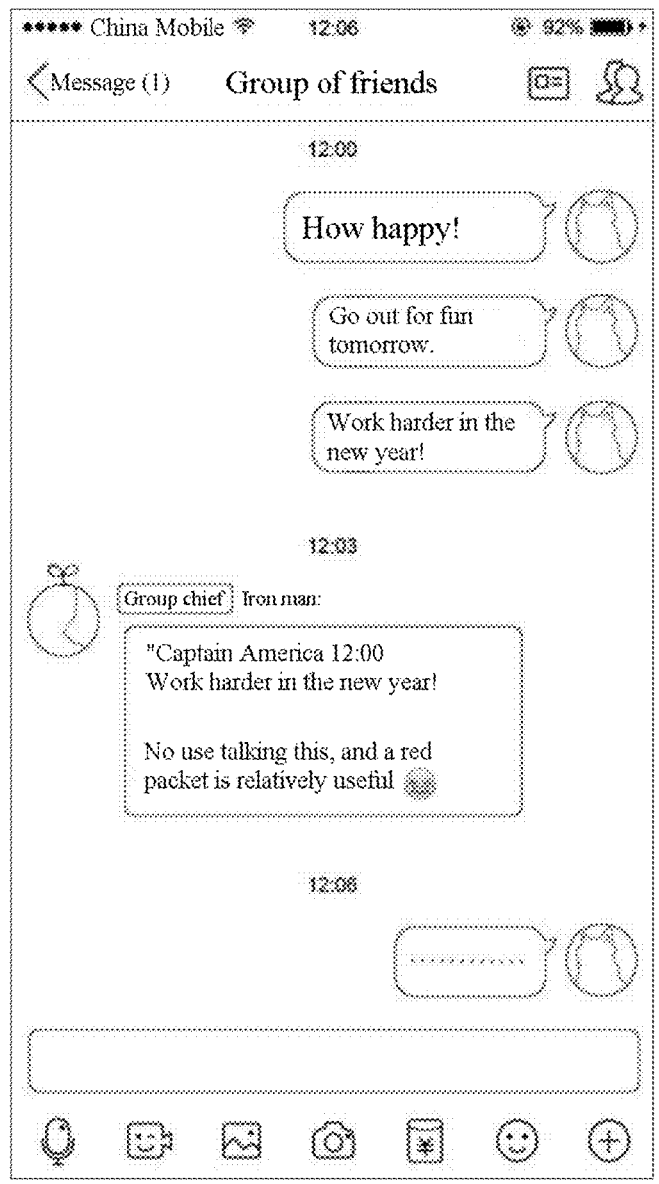
FIG. 17 illustrates a schematic screenshot diagram of displaying, by a second client, a first reply message corresponding to a second touch control signal according to an embodiment of the present invention.

FIG. 17 is a schematic screenshot diagram of displaying, by a second client, a first reply message corresponding to a second touch control signal according to an embodiment of the present invention. As shown in FIG. 17, after a preset message interface receives the second touch control signal, the second client displays, according to the second touch control signal, a first chat message "Work harder in the new year" corresponding to data of the first chat message and the first reply message "No use talking this, and a red packet is relatively useful" corresponding to data of the first reply message. In addition, the posting time of the first chat message "Work harder in the new year" and the posting time of the first reply message "No use talking this, and a red packet is relatively useful" is displayed. The second client further displays another message that is posted within a same time segment that is the same as that within which the first chat message is posted, for example, messages of "How happy", "Go out for fun tomorrow", and "Work harder in the new year" that are from the first account. The second client may further reply to the first reply message by using the first account, for example, reply to a message of " . . . ."

Figure 18:
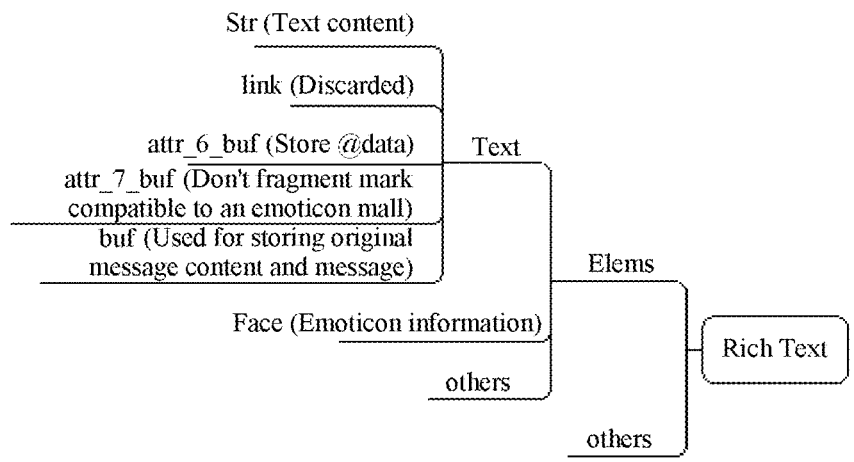
FIG. 18 illustrates a schematic structural diagram of a message according to an embodiment of the present invention.

FIG. 18 is a schematic structural diagram of a message according to an embodiment of the present invention. As shown in FIG. 18, the schematic structural diagram of the message may be a support file stored in a database. The file comprises element content and other content. The element content comprises text information (Text), emoticon information (Face), and other information (others). The text information (Text) comprises text content (str), discarded content (link), a content file (attr_6_buf) for storing @data, a don't fragment mark file (attr_7_buf) compatible to an emoticon mall, and a file for storing original message content and message time sequence (msgseq). The file fields for storing the original message content and the msgseq may store original messages and reply messages, and the sending time of the original message and the sending time of the reply message. By adding the field of the message content and the msgseq, the message body may be generated, and the message body is outputted to a group chat interface in time and effectively, alerting in time a user that replies to the first chat message and a user that receives a reply, helping a user to obtain useful information in group chat in time, reducing message obtaining cost, and then resolving the technical problem of high message obtaining cost.

It should be noted that, according to the foregoing embodiments, for brief descriptions, the methods are described as a combination of a series of actions. However, a person skilled in the art should know that, the present disclosure is not limited by an action sequence that is described, because some steps may be performed in other sequences or simultaneously according to the present disclosure. Further, the person skilled in the art should also know that, all the embodiments described in the specification are exemplary embodiments, and not all the actions and modules may be necessarily required by the present disclosure.

According to the foregoing descriptions of implementations, the person skilled in the art may clearly know that the method according to the foregoing embodiments may be implemented by using software and a general hardware platform, or certainly may be implemented by using hardware. Based on such understanding, a technical solution of the present invention may be embodied in a software product form. The computer software product is stored on a storage medium such as a read-only memory (ROM), a random access memory (RAM), a magnetic disk, or an optical disc, and comprises several instructions used to make a terminal device (which may be a mobile phone, a computer, a server, and a network device) perform the method in the embodiments of the present invention.

Figure 19:
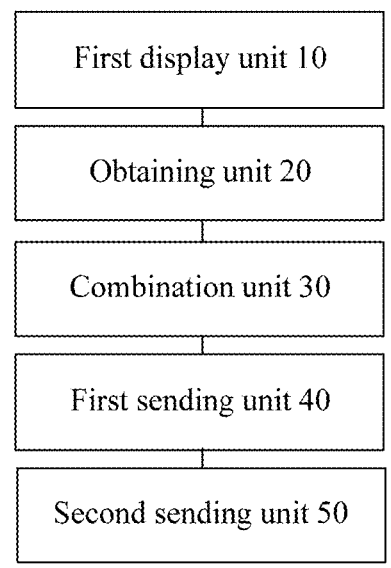
FIG. 19 illustrates a schematic diagram of a message sending apparatus according to an embodiment of the present invention.

According to another embodiment of the present invention, a message sending apparatus for implementing the foregoing methods is further provided. FIG. 19 is a schematic diagram of a message sending apparatus according to an embodiment of the present invention. As shown in FIG. 19, the apparatus comprises: a first display unit 10, an obtaining unit 20, a combination unit 30, and a first sending unit 40, and a second sending unit 50.

The first display unit 10 may be configured to perform step S201 in the embodiments of the present invention, the obtaining unit 20 may be configured to perform step S202 in the embodiments of the present invention, the combination unit 30 may be configured to perform step S203 in the embodiments of the present invention, the sending unit 40 may be configured to perform step S204 in the embodiments of the present invention, and the second sending unit 50 may be configured to perform step S205 in the embodiments of the present invention.

The first display unit 10 is configured to display a chat message on a chat interface, wherein the chat interface is a group chat interface or a single chat interface, the group chat interface is a chat interface that at least three chat accounts participate, and the single chat interface is a chat interface that two chat accounts participate.

The obtaining unit 20 is configured to: when a reply operation performed by a user on a first chat message in the chat message is detected, obtain content of the first chat message and content of a reply message corresponding to the reply operation.

The combination unit 30 is configured to combine the content of the first chat message and the content of the reply message into a second chat message.

The first sending unit 40 is configured to: when the first chat message is a chat message on the group chat interface, send the second chat message to a client corresponding to each chat account that participates in a group chat.

The second sending unit 50 is configured to: when the first chat message is a chat message on the single chat interface, send the second chat message to a client corresponding to a chat account that releases the first chat message.

It should be noted herein that, the first display unit 10, the obtaining unit 20, the combination unit 30, the first sending unit 40, and the second sending unit 50 may run in a computer terminal as a portion of the apparatus. Functions implemented by the foregoing modules may be performed by using a processor in the computer terminal. The computer terminal may alternatively be a terminal device such as a smartphone (such as an Android mobile phone or an iOS mobile phone), a tablet computer, a palmtop computer, a mobile Internet device (MID), or a PAD.

Figure 20:
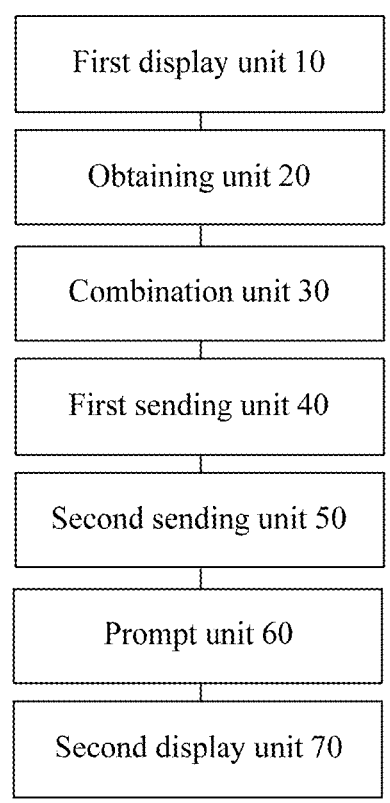
FIG. 20 illustrates a schematic diagram of a message sending apparatus according to an embodiment of the present invention.

Optionally, FIG. 20 is a schematic diagram of a message sending apparatus according to an embodiment of the present invention. As shown in FIG. 20, the message sending apparatus comprises: a first display unit 10, an obtaining unit 20, a combination unit 30, a first sending unit 40, and a second sending unit 50. The message sending apparatus further comprises a prompt unit 60 and a second display unit 70.

The first display unit 10, the obtaining unit 20, the combination unit 30, the first sending unit 40, and the second sending unit 50 in this embodiment have same functions as the functions of those in the message sending apparatus in the previous embodiment of the present invention. Details are not described herein again.

The prompt unit 60 is configured to: after a second chat message is sent to a client corresponding to a first chat message and a client corresponding to another chat message different from the first chat message in the chat message, prompt in a message group that the first chat message has a reply message.

The second display unit 70 is configured to: after a viewing operation performed by the user on the reply message is received, display a preset message interface, wherein the preset message interface is an interface used for displaying the second chat message.

It should be noted herein that, the prompt unit 60 and the second display unit 70 may run in a computer terminal as a portion of the apparatus. Functions implemented by the foregoing modules/units may be performed by using a processor in the computer terminal. The computer terminal may alternatively be a terminal device such as a smartphone (such as an Android mobile phone or an iOS mobile phone), a tablet computer, a palmtop computer, a mobile Internet device (MID), or a PAD.

Figure 21:
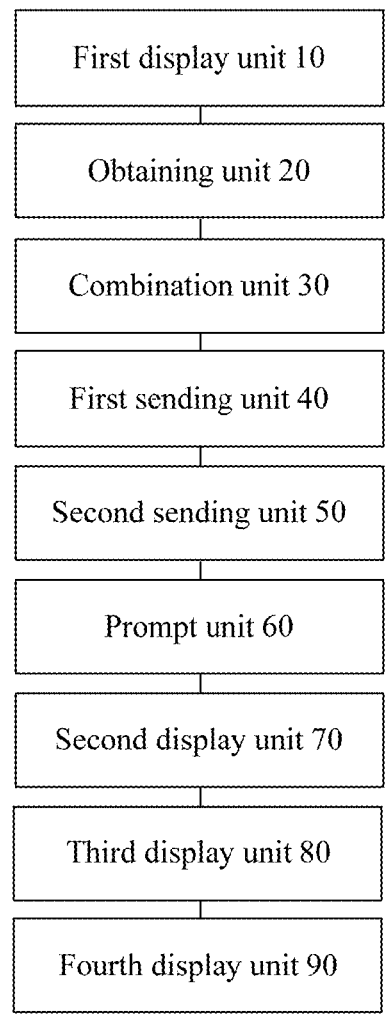
FIG. 21 illustrates a schematic diagram of a message sending apparatus according to an embodiment of the present invention.

Optionally, FIG. 21 is a schematic diagram of a message sending apparatus according to an embodiment of the present invention. As shown in FIG. 21, the message sending apparatus comprises: a first display unit 10, an obtaining unit 20, a combination unit 30, a first sending unit 40, a second sending unit 50, a prompt unit 60, and a second display unit 70. The message sending apparatus further comprises a third display unit 80 and a fourth display unit 90.

The first display unit 10, the obtaining unit 20, the combination unit 30, the first sending unit 40, the second sending unit 50, the prompt unit 60, and the second display unit 70 in this embodiment have same functions as the functions of those in the message sending apparatus in the previous embodiment of the present invention. Details are not described herein again.

The third display unit 80 is configured to: after it is prompted in a message group that the first chat message has the reply message, display information about an account corresponding to the reply message.

The fourth display unit 90 is configured to display a message reply body according to the information about the account corresponding to the reply message, where the message reply body comprises message data corresponding to the second chat message.

Optionally, the fourth display unit 90 is configured to: when a viewing operation performed by the user on the message reply body is detected, display the content of the first chat message, the message posting time corresponding to the first chat message, the content of the reply message, and the message posting time corresponding to the reply message.

It should be noted herein that, the third display unit 80 and the fourth display unit 90 may run in a computer terminal as a portion of the apparatus. Functions implemented by the foregoing modules may be performed by using a processor in the computer terminal. The computer terminal may alternatively be a terminal device such as a smartphone (such as an Android mobile phone or an iOS mobile phone), a tablet computer, a palmtop computer, a mobile Internet device (MID), or a PAD.

Figure 22:
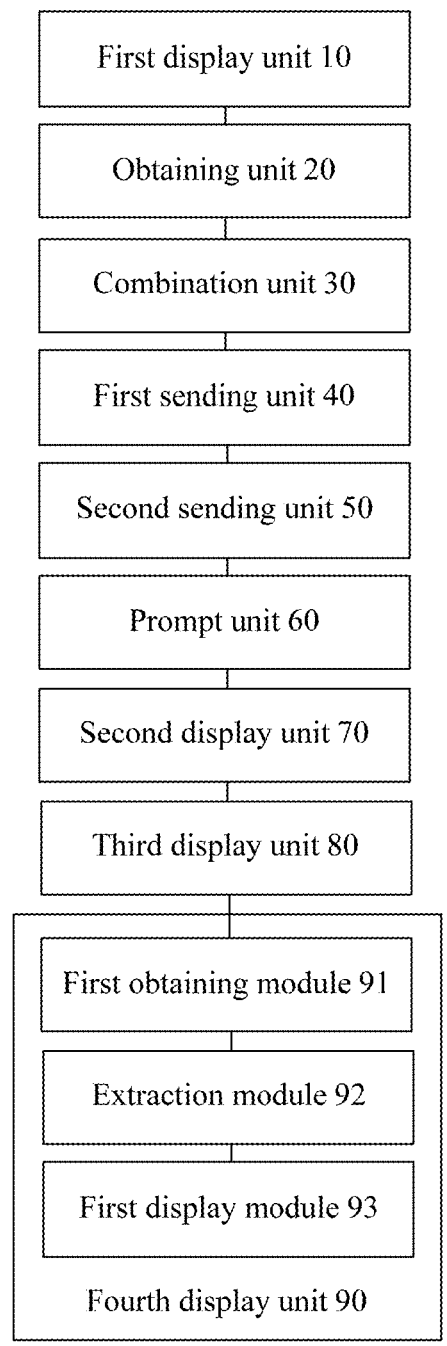
FIG. 22 illustrates a schematic diagram of a message sending apparatus according to an embodiment of the present invention.

Optionally, FIG. 22 is a schematic diagram of a message sending apparatus according to an embodiment of the present invention. As shown in FIG. 22, the message sending apparatus comprises: a first display unit 10, an obtaining unit 20, a combination unit 30, a first sending unit 40, a second sending unit 50, a prompt unit 60, a second display unit 70, a third display unit 80, and a fourth display unit 90. The fourth display unit 90 comprises: a first obtaining module 91, an extraction module 92, and a first display module 93.

The first display unit 10, the obtaining unit 20, the combination unit 30, the first sending unit 40, the prompt unit 60, the second display unit 70, the third display unit 80, and the display unit 90 in this embodiment have same functions as the functions of those in the message sending apparatus in the third embodiment of the present invention. Details are not described herein again.

The first obtaining module 91 is configured to obtain a preset field, wherein the preset field is used for recording the content of the first chat message, the content of the reply message, and time sequence information respectively corresponding to the content of the first chat message and the content of the reply message.

The extraction module 92 is configured to extract the time sequence information from the preset field.

The first display module 93 is configured to display the content of the first chat message and the content of the reply message according to the time sequence information.

It should be noted herein that, the first obtaining module 91, the extraction module 92, and the first display module 93 may run in a computer terminal as a portion of the apparatus. Functions implemented by the foregoing modules may be performed by using a processor in the computer terminal. The computer terminal may alternatively be a terminal device such as a smartphone (such as an Android mobile phone or an iOS mobile phone), a tablet computer, a palmtop computer, a mobile Internet device (MID), or a PAD.

Figure 23:
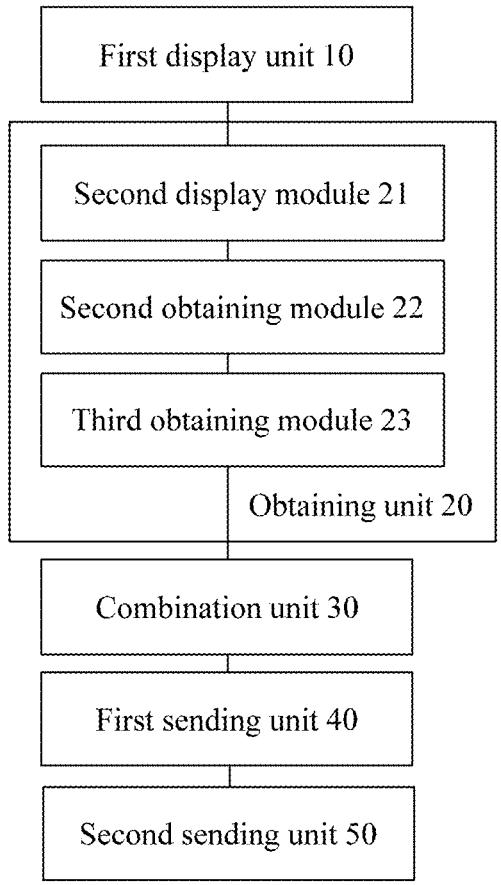
FIG. 23 illustrates a schematic diagram of a message sending apparatus according to an embodiment of the present invention.

Optionally, FIG. 23 is a schematic diagram of a message sending apparatus according to an embodiment of the present invention. As shown in FIG. 23, the message sending apparatus comprises: a first display unit 10, an obtaining unit 20, a combination unit 30, a first sending unit 40, and a second sending unit 50. The obtaining unit 20 comprises: a second display module 21, a second obtaining module 22, and a third obtaining module 23.

The first display unit 10, the obtaining unit 20, the combination unit 30, the first sending unit 40, and the second sending unit 50 in this embodiment have same functions as the functions of those in the message sending apparatus in the previous embodiments of the present invention. Details are not described herein again.

The second display module 21 is configured to display a message operation bar of the first chat message, wherein the message operation bar is used for displaying a menu for performing an operation on the first chat message.

The second obtaining module 22 is configured to obtain a trigger signal of a reply menu in the message operation bar.

The third obtaining module 23 is configured to display content of the first chat message and content of a reply message according to the trigger signal.

It should be noted herein that, the second display module 21, the second obtaining module 22, and the third obtaining module 23 may run in a computer terminal as a portion of the apparatus. Functions implemented by the foregoing modules may be performed by using a processor in the computer terminal. The computer terminal may alternatively be a terminal device such as a smartphone (such as an Android mobile phone or an iOS mobile phone), a tablet computer, a palmtop computer, a mobile Internet device (MID), or a PAD.

In one embodiment, the first display unit 10 displays the chat message on the chat interface. The chat interface is the group chat interface or the single chat interface. The group chat interface is a chat interface that at least three chat accounts participate, and the single chat interface is a chat interface that two chat accounts participate. When detecting the reply operation performed by the user on the first chat message in the chat message, the obtaining unit 20 obtains the content of the first chat message and the content of the reply message corresponding to the reply operation. The combination unit 30 combines the content of the first chat message and the content of the reply message into the second chat message. When the first chat message is the chat message on the group chat interface, the first sending unit 40 sends the second chat message to the client corresponding to each chat account that participates in the group chat. When the first chat message is the chat message on the single chat interface, the second sending unit 50 sends the second chat message to the client corresponding to the chat account that releases the first chat message. As a result, a technical effect of reducing message obtaining cost is achieved, and the objective of quickly locating and displaying a chat message is achieved, improving user experience, and then resolving the technical problem of high message obtaining cost.

The functional modules provided in the embodiment of this application may run in a mobile terminal, a computer terminal, or a similar operation apparatus, or may be stored as a portion of a storage medium.

According to another embodiment, a computer terminal may be provided. The computer terminal may be any computer terminal device in a computer terminal group. Optionally, in this embodiment, the computer terminal may be replaced with a terminal device such as a mobile terminal.

Optionally, in this embodiment, the computer terminal may be located in at least one network device of multiple network devices in a computer network.

An embodiment of the present invention further provides a storage medium. Optionally, in this embodiment, the storage medium may store program code or computer instructions. The program code is used for performing the steps in the message sending methods provided in the foregoing embodiments.

Optionally, in this embodiment, the storage medium may be located in any computer terminal in a computer terminal group in a computer network, or located in any mobile terminal in a mobile terminal group.

Optionally, in this embodiment, the storage medium is set to store program code used to perform the followings.

Displaying a chat message on a chat interface, wherein the chat interface is a group chat interface or a single chat interface, the group chat interface is a chat interface that at least three chat accounts participate, and the single chat interface is a chat interface that two chat accounts participate.

When detecting a reply operation performed by a user on a first chat message in the chat message, obtaining content of the first chat message and content of a reply message corresponding to the reply operation.

Combining the content of the first chat message and the content of the reply message into a second chat message.

When the first chat message is a chat message on the group chat interface, sending the second chat message to a client corresponding to each chat account that participates in a group chat.

When the first chat message is a chat message on the single chat interface, sending the second chat message to a client corresponding to a chat account that releases the first chat message.

Optionally, the storage medium is further configured to store program code used for performing the followings: after the second chat message is sent to the client corresponding to each chat account that participates in the group chat or the second chat message is sent to the client corresponding to the chat account that releases the first chat message, prompting that the first chat message has a reply message; and after receiving a viewing operation performed by the user on the reply message, displaying a preset message interface, wherein the preset message interface is an interface used for displaying the second chat message.

Optionally, the storage medium is further configured to store program code used for performing the followings: after it is prompted in a message group that the first chat message has the reply message, displaying information about an account corresponding to the reply message; and displaying a message reply body according to the information about the account corresponding to the reply message, wherein the message reply body comprises message data corresponding to the second chat message.

Optionally, the storage medium is further configured to store program code used for performing the followings: when detecting a viewing operation performed by the user on the message reply body, displaying the content of the first chat message, a message posting time corresponding to the first chat message, the content of the reply message, and a message posting time corresponding to the reply message.

Optionally, the storage medium is further configured to store program code used for performing the followings: obtaining a preset field, wherein the preset field is used for recording the content of the first chat message, the content of the reply message, and time sequence information respectively corresponding to the content of the first chat message and the content of the reply message; extracting time sequence information from the preset field; and displaying the content of the first chat message and the content of the reply message according to the time sequence information.

Optionally, to implement detection of a reply operation performed by a user on a first chat message in the chat message, the storage medium is further configured to store program code used for performing the followings: displaying a message operation bar of the first chat message, wherein the message operation bar is used for displaying a menu for performing an operation on the first chat message; obtaining a trigger signal of a reply menu in the message operation bar; and displaying content of the first chat message and content of a reply message according to the trigger signal.

Optionally, the storage medium is further configured to store program code used for performing the followings: after it is prompted in a message group that the first chat message has the reply message, displaying information about an account corresponding to the reply message; and displaying a message reply body according to the information about the account corresponding to the reply message, wherein the message reply body comprises message data corresponding to the second chat message.

Optionally, in this embodiment, the storage medium may comprise but is not limited to various mediums that can store program code, for example, a USB disk, a read-only memory (ROM), a random access memory (RAM), a mobile disk, a magnetic disk, and an optical disc.

The foregoing describes the message sending method and apparatus with reference to the accompanying drawings by using examples. However, a person skilled in the art should understand that, various improvements may be further performed on the message sending method and apparatus provided in the present disclosure, without disobeying content of the present disclosure. Therefore, the protection scope of the present disclosure should be determined by content of the claims.

Another embodiment of the present invention further provides a computer terminal. The computer terminal may be any computer terminal device in a computer terminal group. Optionally, in this embodiment, the computer terminal may be replaced with a terminal device such as a mobile terminal.

Optionally, the computer terminal may be located in at least one network device of multiple network devices in a computer network.

Figure 24:
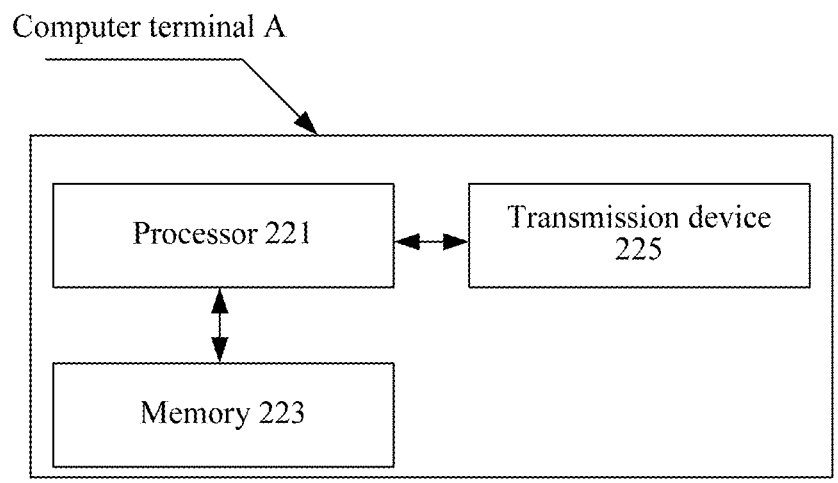
FIG. 24 illustrates a structural block diagram of a computer terminal according to an embodiment of the present invention.

Optionally, FIG. 24 is a structural block diagram of a computer terminal according to an embodiment of the present invention. As shown in FIG. 24, the computer terminal A may comprise: one or more (only one is shown in the figure) processors 221, a memory 223, and a transmission device 225.

The memory 223 may be configured to store a software program and module, such as a program instruction/module corresponding to the message sending method and apparatus in the embodiments of the present invention. The processor 221 runs the software program and module stored in the memory 223, so as to execute various function applications and data processing, that is, implement the foregoing message sending method. The memory 223 may comprise a high speed random access memory, and may further comprise a non-volatile memory, such as one or more magnetic storage apparatuses, flash memories, or other non-volatile solid-state memories. In some instances, the memory 223 may further comprise memories remotely set relative to the processor 221, and these remote memories may be connected to a computer terminal A by using a network. An instance of the foregoing network includes but is not limited to the Internet, an enterprise intranet, a local area network, a mobile communications network, or a combination thereof.

The transmission device 225 is configured to receive or send data by using a network, which may comprise a wired network or a wireless network. In one embodiment, the transmission device 225 comprises a network interface controller, and the network interface controller may be connected to another network device or a router by using a network cable, so as to communicate with the Internet or a local area network. In another embodiment, the transmission device 225 is a radio frequency module, and the radio frequency module is configured to communicate with the Internet in a wireless manner.

Specifically, the memory 223 is configured to store information about a preset action condition and a preset authorized user, and an application program.

The processor 221 may use information and an application program that are stored in the memory 223 to execute program code used for performing the steps in the methods in the disclosed embodiments, including the followings.

Displaying a chat message on a chat interface, wherein the chat interface is a group chat interface or a single chat interface, the group chat interface is a chat interface that at least three chat accounts participate, and the single chat interface is a chat interface that two chat accounts participate.

When detecting a reply operation performed by a user on a first chat message in the chat message, obtaining content of the first chat message and content of a reply message corresponding to the reply operation.

Combining the content of the first chat message and the content of the reply message into a second chat message.

When the first chat message is a chat message on the group chat interface, sending the second chat message to a client corresponding to each chat account that participates in a group chat.

When the first chat message is a chat message on the single chat interface, sending the second chat message to a client corresponding to a chat account that releases the first chat message.

A person of ordinary skill in the art may understand that, the computer terminal may alternatively be a terminal device such as a smartphone (such as an Android mobile phone or an iOS mobile phone), a tablet computer, a palmtop computer, and a mobile Internet device (MID), or a PAD.

The person of ordinary skill in the art may understand that all or some of the steps in the methods of the foregoing embodiments may be implemented by a program instructing related hardware of a terminal device. The program may be stored in a computer readable storage medium. The storage medium may include: a flash drive, a read-only memory (ROM), a random access memory (RAM), a magnetic disk, an optical disc, or the like.

In the embodiments of the present invention, the descriptions about the embodiments have respective emphases. For a portion that is not described in one embodiment, refer to a related description in another embodiment.

In the several embodiments provided in this application, it should be understood that the disclosed client may be implemented in other manners. The apparatus embodiments described in the foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

Described in the foregoing are only preferable implementations of the present invention. It should be pointed out that, the person of ordinary skill in the art may further make several improvements and modifications without disobeying the principle of the present invention. These improvements and modifications should also fall within the protection scope of the present invention.

What is claimed is:

1. A message sending method, comprising:
   displaying chat messages on a chat interface, wherein the chat interface is one of a group chat interface and a single chat interface, the group chat interface being a chat interface that at least three chat accounts participate, and the single chat interface being a chat interface that two chat accounts participate;
   when detecting a reply operation directed to a first chat message in the chat messages, obtaining content of the first chat message and content of a reply message corresponding to the reply operation;
   combining the content of the first chat message and the content of the reply message into a second chat message;
   when the first chat message is on the group chat interface, sending the second chat message to a client corresponding to each chat account that participates in a group chat;
   when the first chat message is on the single chat interface, sending the second chat message to a client corresponding to a chat account that posted the first chat message;
   prompting that the first chat message has the reply message; and
   after receiving a viewing operation directed to the reply message, displaying a preset message interface, wherein the preset message interface is an interface used for displaying the second chat message.

2. The method according to claim 1, wherein, after prompting that the first chat message has the reply message, the method further comprises:
   displaying information about an account corresponding to the reply message; and
   displaying a message reply body according to the information about the account corresponding to the reply message, wherein the message reply body includes message data corresponding to the second chat message.

3. The method according to claim 2, wherein the displaying a message reply body according to the information about the account corresponding to the reply message comprises:
   obtaining a preset field, wherein the preset field is used for recording the content of the first chat message, the content of the reply message, and time sequence information respectively corresponding to the content of the first chat message and the content of the reply message;
   extracting the time sequence information from the preset field; and
   displaying the content of the first chat message and the content of the reply message according to the time sequence information.

4. The method according to claim 1, wherein the displaying a message reply body according to the information about the account corresponding to the reply message comprises:
   when detecting the viewing operation, displaying the content of the first chat message, message posting time corresponding to the first chat message, the content of the reply message, and message posting time corresponding to the reply message.

5. The method according to claim 1, wherein the detecting a reply operation directed to a first chat message in the chat message comprises:
   displaying a message operation bar of the first chat message, wherein the message operation bar is used for displaying a reply menu for performing an operation on the first chat message;

obtaining a trigger signal of the reply menu in the message operation bar; and displaying the content of the first chat message and the content of the reply message according to the trigger signal.

6. The method according to claim 1, wherein the at least three chat accounts include chat-account-one, chat-account-two, and chat-account-three all displayed on the group chat interface, the group chat interface is logged on via the chat-account-two, the first chat message is displayed next to the chat-account-one on the group chat interface, the first chat message and the reply message are displayed between the chat-account-one and the chat-account-two on the group chat interface.

7. The method according to claim 1, wherein the preset message interface is displayed on a second client logged in via the chat-account-one or the chat-account-three, the first chat message is displayed next to the chat-account-one on the preset message interface, the second chat message is displayed between the chat-account-one and the chat-account-two on the preset message interface.

8. A message sending system, comprising: a memory storing instructions; and a processor coupled to the memory and, when executing the instructions, configured for:

displaying chat messages on a chat interface, wherein the chat interface is one of a group chat interface and a single chat interface, the group chat interface being a chat interface that at least three chat accounts participate, and the single chat interface being a chat interface that two chat accounts participate;

when detecting a reply operation directed to a first chat message in the chat messages, obtaining content of the first chat message and content of a reply message corresponding to the reply operation;

combining the content of the first chat message and the content of the reply message into a second chat message;

when the first chat message is on the group chat interface, sending the second chat message to a client corresponding to each chat account that participates in a group chat;

when the first chat message is on the single chat interface, sending the second chat message to a client corresponding to a chat account that posted the first chat message;

prompting that the first chat message has the reply message; and after receiving a viewing operation directed to the reply message, displaying a preset message interface, wherein the preset message interface is an interface used for displaying the second chat message.

9. The system according to claim 8, wherein, after prompting that the first chat message has the reply message, the processor is further configured for:

displaying information about an account corresponding to the reply message; and displaying a message reply body according to the information about the account corresponding to the reply message, wherein the message reply body includes message data corresponding to the second chat message.

10. The system according to claim 9, wherein the displaying a message reply body according to the information about the account corresponding to the reply message comprises:

obtaining a preset field, wherein the preset field is used for recording the content of the first chat message, the content of the reply message, and time sequence information respectively corresponding to the content of the first chat message and the content of the reply message;

extracting the time sequence information from the preset field; and displaying the content of the first chat message and the content of the reply message according to the time sequence information.

11. The system according to claim 8, wherein the displaying a message reply body according to the information about the account corresponding to the reply message comprises:

when detecting the viewing operation, displaying the content of the first chat message, message posting time corresponding to the first chat message, the content of the reply message, and message posting time corresponding to the reply message.

12. The system according to claim 8, wherein the detecting a reply operation directed to a first chat message in the chat message comprises:

displaying a message operation bar of the first chat message, wherein the message operation bar is used for displaying a reply menu for performing an operation on the first chat message;

obtaining a trigger signal of the reply menu in the message operation bar; and displaying the content of the first chat message and the content of the reply message according to the trigger signal.

13. The system according to claim 8, wherein the at least three chat accounts include chat-account-one, chat-account-two, and chat-account-three all displayed on the group chat interface, the group chat interface is logged on via the chat-account-two, the first chat message is displayed next to the chat-account-one on the group chat interface, the first chat message and the reply message are displayed between the chat-account-one and the chat-account-two on the group chat interface.

14. The system according to claim 8, wherein the preset message interface is displayed on a second client logged in via the chat-account-one or the chat-account-three, the first chat message is displayed next to the chat-account-one on the preset message interface, the second chat message is displayed between the chat-account-one and the chat-account-two on the preset message interface.

15. A non-transitory computer-readable storage medium containing computer-executable instructions for, when executed by one or more processors, performing a message sending method, the method comprising:

displaying chat messages on a chat interface, wherein the chat interface is one of a group chat interface and a single chat interface, the group chat interface being a chat interface that at least three chat accounts participate, and the single chat interface being a chat interface that two chat accounts participate;

when detecting a reply operation directed to a first chat message in the chat messages, obtaining content of the first chat message and content of a reply message corresponding to the reply operation;

combining the content of the first chat message and the content of the reply message into a second chat message;

when the first chat message is on the group chat interface, sending the second chat message to a client corresponding to each chat account that participates in a group chat;

when the first chat message is on the single chat interface, sending the second chat message to a client corresponding to a chat account that posted the first chat message; prompting that the first chat message has the reply message; and after receiving a viewing operation directed to the reply message, displaying a preset message interface, wherein the preset message interface is an interface used for displaying the second chat message.

16. The non-transitory computer-readable storage medium according to claim 15, wherein, after prompting that the first chat message has the reply message, the method further comprises:

displaying information about an account corresponding to the reply message; and displaying a message reply body according to the information about the account corresponding to the reply message, wherein the message reply body includes message data corresponding to the second chat message.

17. The non-transitory computer-readable storage medium according to claim 16, wherein the displaying a message reply body according to the information about the account corresponding to the reply message comprises:

obtaining a preset field, wherein the preset field is used for recording the content of the first chat message, the content of the reply message, and time sequence information respectively corresponding to the content of the first chat message and the content of the reply message;

extracting the time sequence information from the preset field; and displaying the content of the first chat message and the content of the reply message according to the time sequence information.

18. The non-transitory computer-readable storage medium according to claim 15, wherein the displaying a message reply body according to the information about the account corresponding to the reply message comprises:

when detecting the viewing operation, displaying the content of the first chat message, message posting time corresponding to the first chat message, the content of the reply message, and message posting time corresponding to the reply message.

19. The non-transitory computer-readable storage medium according to claim 15, wherein the detecting a reply operation directed to a first chat message in the chat message comprises:

displaying a message operation bar of the first chat message, wherein the message operation bar is used for displaying a reply menu for performing an operation on the first chat message;

obtaining a trigger signal of the reply menu in the message operation bar; and displaying the content of the first chat message and the content of the reply message according to the trigger signal.

20. The non-transitory computer-readable storage medium according to claim 15, wherein the at least three chat accounts include chat-account-one, chat-account-two, and chat-account-three all displayed on the group chat interface, the group chat interface is logged on via the chat-account-two, the first chat message is displayed next to the chat-account-one on the group chat interface, the first chat message and the reply message are displayed between the chat-account-one and the chat-account-two on the group chat interface.

* * * * *